US011557007B2

(12) United States Patent
Schönfeld

(10) Patent No.: US 11,557,007 B2
(45) Date of Patent: Jan. 17, 2023

(54) UTILITY MONITORING AND UTILITY USAGE DETERMINATION, CONTROL AND OPTIMIZATION

(71) Applicant: PowerX Technology Inc., Brooklyn, NY (US)

(72) Inventor: Manuel Schönfeld, Murrhardt (DE)

(73) Assignee: PowerX Technology Inc., Brooklyn, NY (US)

( * ) Notice: Subject to any disclaimer, the term of this patent is extended or adjusted under 35 U.S.C. 154(b) by 0 days.

(21) Appl. No.: 17/491,497

(22) Filed: Sep. 30, 2021

(65) Prior Publication Data

US 2022/0101456 A1   Mar. 31, 2022

Related U.S. Application Data

(60) Provisional application No. 63/085,918, filed on Sep. 30, 2020.

(51) Int. Cl.
*G06Q 50/06* (2012.01)
*G06N 20/00* (2019.01)
*F24H 9/20* (2022.01)
*F17D 5/06* (2006.01)

(52) U.S. Cl.
CPC .............. *G06Q 50/06* (2013.01); *F17D 5/06* (2013.01); *F24H 9/2007* (2013.01); *G06N 20/00* (2019.01)

(58) Field of Classification Search
CPC .......... G06Q 50/06; G06N 20/00; F17D 5/06; F24H 9/2007
See application file for complete search history.

(56) References Cited

U.S. PATENT DOCUMENTS

| | | | |
|---|---|---|---|
| 2004/0117330 A1* | 6/2004 | Ehlers | H04L 67/125 705/412 |
| 2007/0203860 A1* | 8/2007 | Golden | G05B 15/02 705/412 |
| 2011/0251807 A1 | 10/2011 | Rada et al. | |
| 2011/0303311 A1 | 12/2011 | Klicpera | |
| 2015/0163412 A1* | 6/2015 | Holley | G06K 9/00771 348/143 |
| 2017/0069008 A1 | 3/2017 | Wang et al. | |
| 2018/0034657 A1* | 2/2018 | Brown | G06Q 10/06 |
| 2019/0190739 A1* | 6/2019 | Guinard | G06N 20/00 |

(Continued)

OTHER PUBLICATIONS

International Search Report in PCT Application No. PCT/US2021/053044, dated Dec. 23, 2021.

*Primary Examiner* — Toan M Le
*Assistant Examiner* — Xiuqin Sun
(74) *Attorney, Agent, or Firm* — Cognition IP, P.C.; Edward Steakley

(57) ABSTRACT

Methods, systems, and apparatus, including computer programs encoded on computer storage media for utility monitoring and utility usage determination, control and optimization. The system receives utility usage information from one or more sensor devices, and obtains water usage information from a first sensor device coupled to a water pipe, obtains electricity usage information from a second sensor device coupled to an electrical panel, and/or obtains water heater usage information from a third sensor device coupled to a water heater. The system may use the obtained utility information to determine types of utility activities and/or appliances being used corresponding to the utility usage.

21 Claims, 27 Drawing Sheets

System Diagram

(56) References Cited

U.S. PATENT DOCUMENTS

2019/0281371 A1    9/2019  Klicpera
2019/0297395 A1*  9/2019  Huang ................... H04N 7/183
2019/0390989 A1   12/2019  Raduchel et al.
2020/0326216 A1* 10/2020  Sarkissian ............ G01N 29/221

* cited by examiner

Computer Diagram

UTILITY MONITORING AND UTILITY USAGE DETERMINATION, CONTROL AND OPTIMIZATION

CROSS-REFERENCE TO RELATED APPLICATIONS

This application relates to and claims the benefit of U.S. Provisional Patent Application No. 63/085,918, filed Sep. 30, 2020, and is hereby incorporated by reference its entirety.

BACKGROUND

Households consume utilities in the form of water, gas and electricity. Monitoring a household's utility consumption is often done at a general level or total consumption level. For example, utility meters are often placed at input locations where they only measure the total amount of the utility being consumed by a household. However, these utility meters are unable to determine the utility usage for various appliances, devices or water outlets of the household. Without this information, one is not able to effectively optimize household utility consumption, or suggest cost saving utility consumption measures. Accordingly, a novel utility monitoring and usage determination, control and optimization system and method are needed.

SUMMARY

Described herein is an innovative system and methods directed toward utility monitoring and utility usage determination, control and optimization. The system receives utility usage information from one or more sensor devices, where the system obtains water usage information from a first sensor device coupled to a water pipe, obtains electricity usage information from a second sensor device coupled to an electrical panel, and/or obtains water heater usage information from a third sensor device coupled to a water heater. The system may use the obtained utility information to determine types of utility activities and/or appliances being used corresponding to the utility usage, control various appliances and household devices, and/or provide optimization information and suggestions to a user. Additionally, multiple sensor devices of different types may be installed in larger buildings.

In one embodiment, the system receives water usage information from a first sensor device where the first sensor device is configured to receive water flow rate information from ultrasonic sensors coupled to a water pipe. The system receives electricity usage information from a second sensor device, where the second sensor device is configured to receive amperage information from clamp meters attached to the lines of an electrical panel, and is configured to receive voltage information and high-resolution wave-form data from a connection to a circuit breaker of the electrical panel. The system receives water heater usage information from a third sensor device, where the third sensor device is configured to receive temperature and other information from temperature sensors positioned about a water heater or from the gas controller of the gas heater. The system may obtain information from one or more of a first sensor device, a second sensor device or a third sensor device.

In one embodiment, the system trains one or more machine learning utility usage models to learn patterns of utility usage. The system receives sensor measurement data from a plurality of utility usage sensors and feeds the sensor measurement data to one or more dynamic machine learning utility usage models. The system then determines using one or more of the machine learning utility usage models whether the received sensor measurement data indicates a utility usage activity type and/or a particular appliance or device being used and or tailored optimization suggestions for a user.

In one aspect, the present disclosure pertains to the measurement and optimization of water heating with tanked water heaters. Information about water heater usage is obtained using a sensor device interconnected with a household water heater.

In another aspect, the present disclosure pertains to the measurement and optimization of electricity usage. Information about electricity usage is obtained using a sensor device interconnected with a household electricity panel.

In another aspect, the present disclosure pertains to the measurement and optimization of water usage. Information about water usage is obtained using a sensor device interconnected with a water piping.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1:
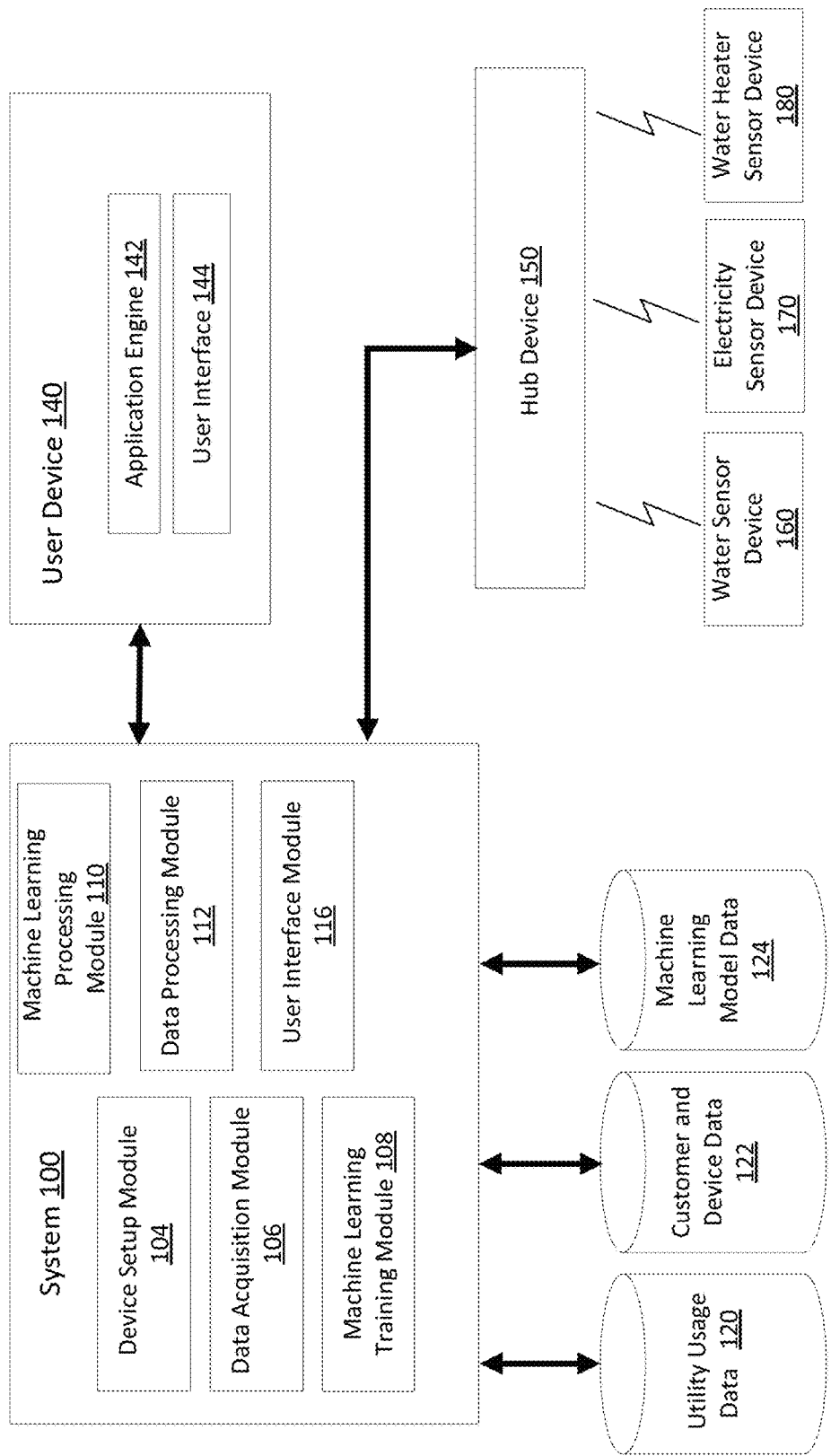
FIG. 1 illustrates a diagram of an example system utilized in utility monitoring and utility usage determination, control and optimization.

In this specification, reference is made in detail to specific embodiments of the invention. Some of the embodiments or their aspects are illustrated in the drawings. In some examples in the drawings the system as described herein is referred to by the trademark PowerX.

For clarity in explanation, the invention has been described with reference to specific embodiments, however, it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Example Utility Monitoring and Utility Usage Determination and Optimization System FIG. 1 illustrates a diagram of an example system 100 utilized in utility monitoring and utility usage determination, control and optimization. The system 100 may include a Device Setup Module 104, a Data Acquisition Module 106, a Machine Learning Training Module 108, a Machine Learning Processing Module 110, a Data Presentation Module 112 and a User Interface Module 116.

While the databases 120, 122, 124, 126 are displayed separately, the databases and information maintained in a database 120, 122, 124, 126 may be combined together or further separated in a manner that promotes retrieval and storage efficiency and/or data security.

The Device Setup Module 104 may perform functionality related to receiving information about sensor devices for configuration and setup for a user account.

The Data Acquisition Module 106 may perform functionality related to handling communication and receipt and transfer of data from/to the hub device 150 and/or to the individual sensor devices (i.e., the water sensor device 160, the electricity sensor device 170, and the water heater sensor device 180).

The Machine Learning Training Module 108 may perform functionality related to training one or more machine learning models based on utility usage data.

The Machine Learning Processing Module 110 may perform functionality related to processing received data from the sensor devices to predict or classify information or utility usage scenarios for a particular user account.

The Data Processing Module 112 may perform functionality related to additional processing of utility usage data.

The User Interface Module 116 may perform functionality related to rendering and display of information as described herein.

The User Device 140 may have an Application Engine 142 and a User Interface 144. It is understood that the system 100 may further include one or more additional modules for performing, or supporting performance of, any operation(s), step(s), act(s), instruction(s) and process(es) described herein.

The system 100 may have multiple hub device(s) 150 connected to the system via a communications channel or link, such as the Internet. The hub device 150 transmits information to the system 100 that has been received from one or more of a water sensor device 160, an electricity sensor device 170 and/or a water heater sensor device 180.

Example Household Configuration

Figure 2:
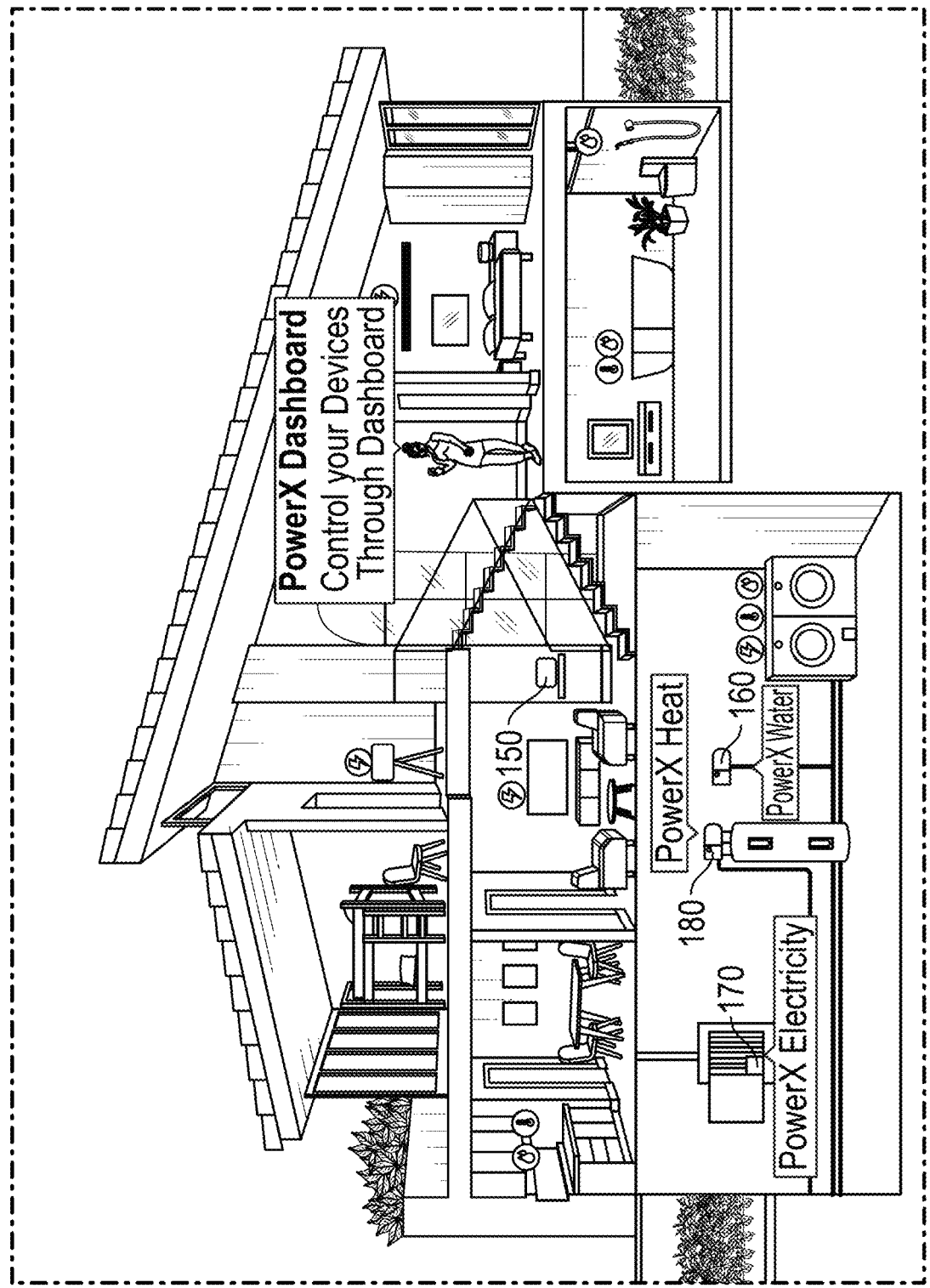
FIG. 2 illustrates a diagram of an example household configured with the utility monitoring and utility usage determination, control and optimization system.

FIG. 2 illustrates a diagram of an example household configured with the utility monitoring and utility usage determination, control and optimization system. As illustrated, a water sensor device 160 is installed and configured to obtain information about water usage. The information obtained by the water sensor device 160 is communicated to a hub device 150 via wireless communications (e.g., LoRa—long range wireless protocol). An electricity sensor device 170 is installed and configured to obtain information about electricity usage. The information obtained by the electricity sensor device 170 is transmitted to the hub device 150 via wireless communications (e.g., via a LoRa protocol). A water heater sensor device 180 is installed and configured to obtain information about heat usage. The information obtained by the water heater sensor device is transmitted to the hub device 150 via wireless communications (e.g., via a LoRa protocol). While communications may be made from the water sensor device 160, the electricity sensor device 170, or the water heater sensor device 180 to the hub device 150 via a LoRa protocol, other methods of wireless or wired transmission of information may be used. The system 100 may be configured with one or more of each of the water sensor device 160, the electricity sensor device 170 and/or the water heater sensor device 180. For example, multiple water heater sensor devices 180 may be installed to monitor two water heaters.

The hub device 150 receives the information from the water sensor device 160, the electricity sensor device 170, and/or the water heater sensor device 180, and transmits the information to the system 100. Also, the hub device 150 may receive information from the system 100. The hub device 150 may be configured to communicate and control further control devices such as smart plug devices, a smart thermostat or a smart shut-off mechanism to automatically stop water-flow remotely. The hub device 150 may also be configured to communicate to further sensing devices such as humidity sensors (to better locate/predict leaks), gas sensors (to locate/predict gas leaks), motion sensors (to optimize light or heat depending on the usage of space by people), location sensors (to find replaced items) and similar sensors. The smart plug device may control various further devices such as lights and other electrical appliances. For example, the hub device 150 may control a smart plug to set time of operation of the electrical appliance connected to the smart plug. The water-flow controller may control various water outlets and automatically protect against leaks. The thermostat may control heat in any location of the building.

Hub Device Configuration and Operation

Figure 6A:
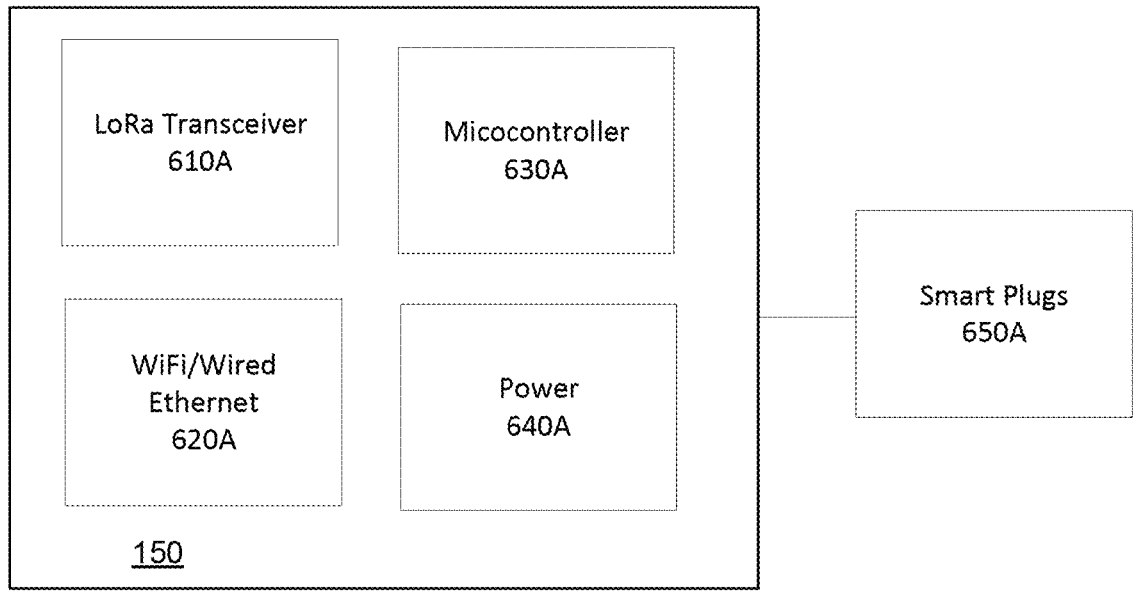
FIG. 6A illustrates an example block diagram of a hub device used with the utility monitoring and utility usage determination, control and optimization system.

FIG. 6A illustrates an example block diagram of a hub device 150 used with the utility monitoring and utility usage determination, control and optimization system. The hub device 150 may be configured to communicate with one or more sensor devices 160, 170, 180. Each of the sensor devices may use a LoRa transceiver to communicate data from and to the devices 150, 160, 170, 180. For example, the devices may use a LoRa physical layer operating in the 868 (CE) MHZ and 915 (FCC) industrial, scientific and medical (ISM) spectrum. The devices 150, 160, 170, 180 may compress data, for example, using the LZ compression algorithm, or other suitable data compression process, before transmitting data to another device, thereby reducing the overall device power consumption by efficiently transmitting data.

In one embodiment, the hub device 150 has a LoRa radio 610A, a WiFi radio 620B (and optionally a wired ethernet connection). The hub device 150 may provide transmission collision avoidance processing to avoid both radios 610A, 620A from transmitting at the same time. This transmission collision avoidance processing helps the hub device 150 avoid undesired effects such as signal intermodulation if the two radios 610A, 620B were to transmit at the same time. The hub device 150 may be connected wired or wirelessly to smart plugs 650A or other devices or sensors which may monitor or control appliances, lighting or other electrical devices, water outlets, temperature, movement or other things (e.g. gas, humidity, location etc.)

The devices 150, 160, 170, 180 may be configured with a power supply for AC and/or DC power using batteries. For example, the hub device 150 may be powered by a power supply 640A using AC, whereas water sensor device 160 may be powered by batteries.

For those sensor devices such as water sensor device 160, or water heating sensor device 180 installed with a gas water heater, the sensor devices 160, 180 may use battery power and operate in a low-power mode and in a regular power mode. In the low-power mode the sensor device 160, 180 has the radio switched off and its microcontroller in a sleep state. The sensor device 160, 180 may be configured to wake up at scheduled, random or pseudo-random time intervals. The hub device 150 may send an instruction to the sensor device 160, 180 to set a particular wake up time interval. At the determined wake up time interval, the sensor device 160, 180 activates it radio and microcontroller. The sensor device 160, 180 then begins obtaining its respective sensor data and transmits the data to the hub device 150.

The sensor devices 160, 170, 180 may also pre-process collected sensor data before transmitting the data the hub device 150. For example, the water sensor device 160 may have onboard chip set that that obtains the sensor data, and converts the time it takes for ultrasound waves to travel through a pipe into a rate of flow value (such as liters or gallons per hour). The water sensor device 160 may sample at a predetermined sample rate, such as 2 times per second, and may determine and send statistical aggregates such as average and standard deviations of larger time periods. This allows the water sensor device 160 to reduce the amount of data sent to the hub device 150, thereby saving battery power. Additionally, as discussed above, the water sensor device 160 may use data compression processing to reduce the amount of data transmitted from the water sensor device 160 to the hub device. The sensor devices 170, 180 determine and send statistical aggregates such as average and standard deviations of larger time period. In some instances, a water sensor device 160 may be powered for several years on 3 or 4 AA batteries due to the battery saving measures taken by the water sensor device 160.

Water Sensor Device Installation and Operation

Figure 3A:
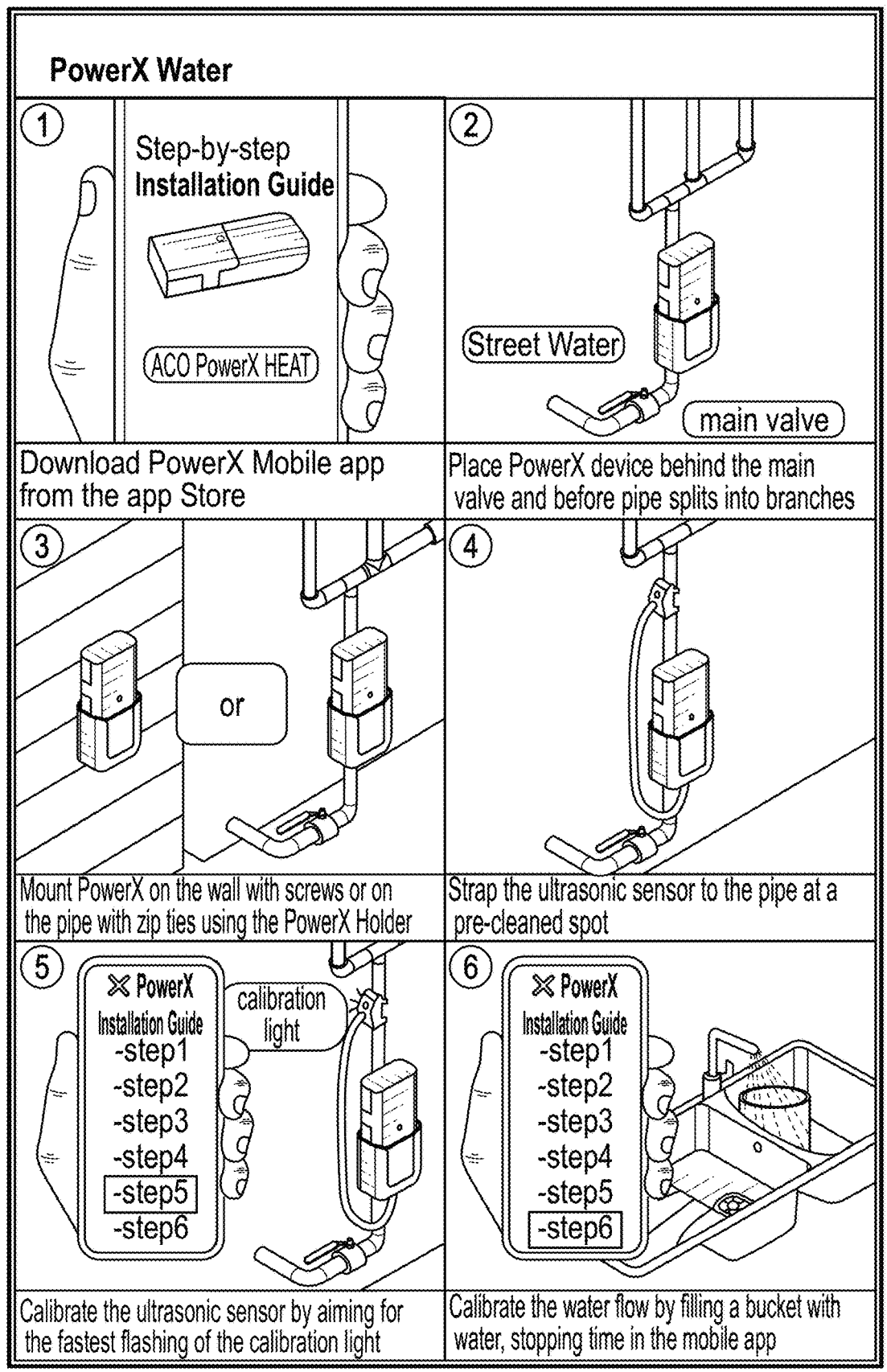
FIG. 3A illustrates installation of a water sensor device used with the utility monitoring and utility usage determination, control and optimization system.

FIG. 3A illustrates installation of a water sensor device 160 used with the utility monitoring and utility usage determination, control and optimization system. The water sensor device 160 provides measurement of water usage using ultra-sonic rays to monitor the flow of water through a pipe via ultrasound sensor caps. The water sensor device 160 may be placed between the main valve going into a household and between the main pipe branches. The water sensor device 160 may be mounted on the pipe or on a wall. Ultrasound sensor caps are placed around or on top of the pipe and may be secured with screws, zip ties or other mounting techniques. The water sensor device 160 may give direct ultrasound performance feedback to the user to place and calibrate the ultrasound sensor caps for best performance. Furthermore, a downloadable app may be installed on a mobile device (such as a table or mobile phone). The mobile app may be used to calibrate the ultrasound sensor caps. Further, the downloadable app may be used to calibrate water volume measurement. The water sensor device 160 may be powered by an onboard power source such as batteries. The ultrasound sensor caps may be installed without lubricant. A silicone pad that is pre-mounted onto the sensor caps allow for a higher accuracy of measurement. For example, the ultrasonic sensors may be coupled to the pipe using a silicone mix pad of 1 mm or thicker.

The water sensor device 160 may obtain sensor readings and transmit the sensor readings to the hub device 150. For example, the water sensor device 160 may determine the flow rate of water flowing through the pipe where the sensors are attached. The water sensor device 160 may transmit the flow rate data (such as liters or gallons per hour) to the hub device 150. The water sensor device 160 may determine the length of time an ultrasound signal takes to travel through a pipe and return. The system 100 may receive this time information and determine the size of the pipe based upon the length of travel time (e.g., determining a pipe size of ½ inch, ¾ inch, 1 inch, 2 inch, etc.).

Additionally, temperature sensors may be coupled to the water sensor device 160 to measure the temperature of the pipe. This temperature information may be transmitted to the hub device 150. For example, optionally two temperature sensors may be placed with one temperature sensor attached to a main inflow pipe, and one temperature sensor attached to a returning pipe. The obtained temperature data may be transmitted to the hub device 150 for transmission to the system 100. The system 100 may then evaluate the water flow data and/or temperature data to determine the heat quantity used by the household or whether a leak is occurring. The temperature sensors do not require contact with the water body, but rather the system 100 may rely on an algorithm that is able to distill the water temperature and heat quantity used from the various temperature influencers, such as ambient temperature and pipe size, thickness or material.

Also, the water sensor device 160 may adjust the amount of power required to send ultrasonic signals through the pipe and obtain the return signal via the ultrasound sensor caps. Information about the power utilized may be sent from the water sensor device 160 to the hub device 150, such as the amount of power needed to obtain an effective ultrasound signal. The power information may be received by the system 100 and the system 100 may determine the type of material of which the pipe is made (e.g., PVC/CPVC/PEX, copper, or steel). The water sensor device 160 would require less power to obtain an effective ultrasound signal for a PVC pipe as compared to a copper pipe. Similarly, the water sensor device 160, would require less power to obtain an effective ultrasound signal for a copper pipe as compared to a steel pipe.

Other information that may be transmitted from the water sensor device 160 include time, battery load status, error code information.

The water sensor device 100 may require calibration as to the pipe upon which the ultrasonic sensors are attached. The water sensor device 160 may be calibrated via the mobile app, the system 100 and/or by the water sensor device 160 itself. For example, the water sensor device 160 may be calibrated by determining the power it takes to send waves through a pipe, by determining the amount of time it takes for ultrasonic waves to travel through a pipe and/or by user calibration using a volume of water filled into a container. The water sensor device 160 may have a light that indicates how well the ultrasound sensors are positioned (e.g. blinking faster if ultrasound is well positioned and signal is strong/well readable and blinking slower if not).

In one calibration mode, the system 100 may calibrate for water flow by using a length of time evaluation to determine the diameter and the material of the pipe. In another calibration mode of the water sensor device 100, a user may fill a container (such as a bucket or pitcher) with a known volume of water (such as a quarter gallon or half a liter), and select a start and stop button on a displayed user interface of the mobile app. The start button is selected when the water begins to fill the buck, and the stop button is selected when the water had been added. The ultrasonic sensors would measure waterflow from the pipe to which they are attached. Since the amount of water filled into the container would be known, water sensor device 160 can calibrate itself.

Figure 6B:
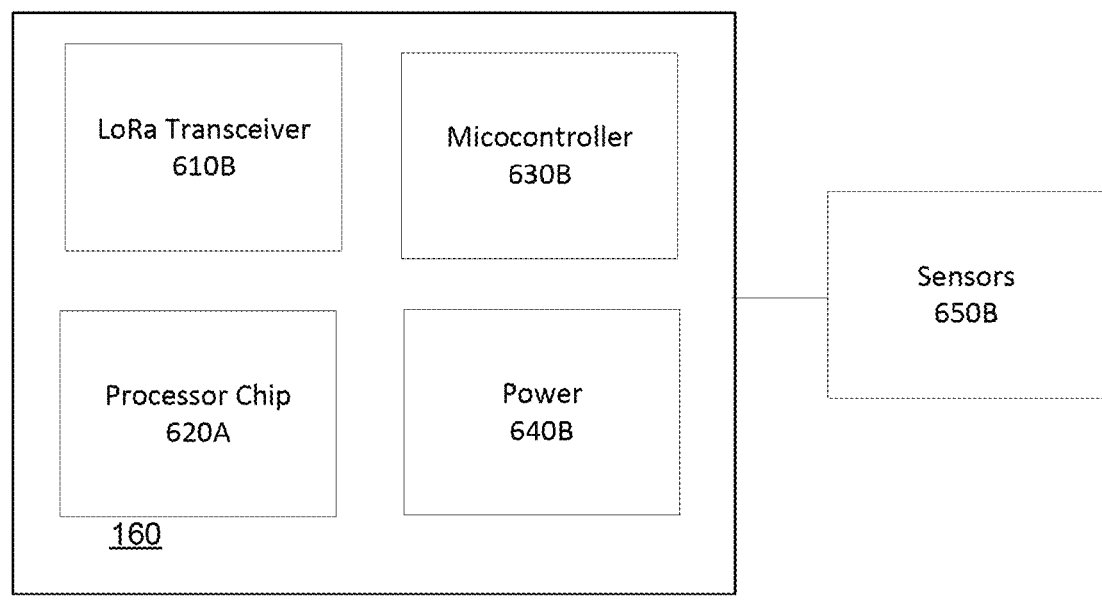
FIG. 6B illustrates an example block diagram of a water sensor device used with the utility monitoring and utility usage determination, control and optimization system.

Referring now to FIG. 6B, discussion of the water sensor device 180 may aid in the understanding of the water sensor device 180 operation. FIG. 6B illustrates an example block diagram of a water sensor device 160 used with the utility monitoring and utility usage determination, control and optimization system. In one embodiment, the water sensor device 160 may be configured with a LoRa radio 610B, a processor chip 620B, a Microcontroller 630B and a power supply 640B. Transducer-type sensors 650B as described herein are interconnected with the water sensor device 180 to measure and monitor water flow and water usage.

The water sensor device 160 draws electricity (<5V) from batteries or a USB adapter. A LoRA chip communicates with the hub device 150, and the LoRA chip is connected to an internal PCB antenna. The LoRa chip is further connected with 2 PT or NTC or digital temperature sensors via cable (Molex connector) and with a processor chip 620A. The processor chip 620A is connected to amplifiers and transducers. The transducers send and receive the ultrasonic waves. The amplifiers amplify the transducers' signal. The water sensor device 160 may use different amplifiers depending on how thick the pipe is (e.g. 2 cm pipe needs different amplifiers than 10 cm industrial pipe). The processor chip samples and translates the signal and hands it via UART (or similar standard) to the LoRA chip. The LoRa chip sends the temperature data to the hub device 150.

The water sensor device 160 (and/or the hub device via a smart plug) may be interconnected to a controllable water valve that allows control of water flow through a pipe. For example, an electro-mechanically operated water valve may be disposed in the main water line, or some other water line of the household. The water sensor device may control the water value to open and close the water valve. In one instance, the system 100 may determine that the house will be unoccupied for a period of time and may close the one or more water valves to stop any flow of water in a respective water line. The system 100 may also close the water valve if the system 100 determines a leak and/or if the user remotely turns off the water (for example, via a mobile application).

Electricity Sensor Device Installation and Operation

Figure 3B:
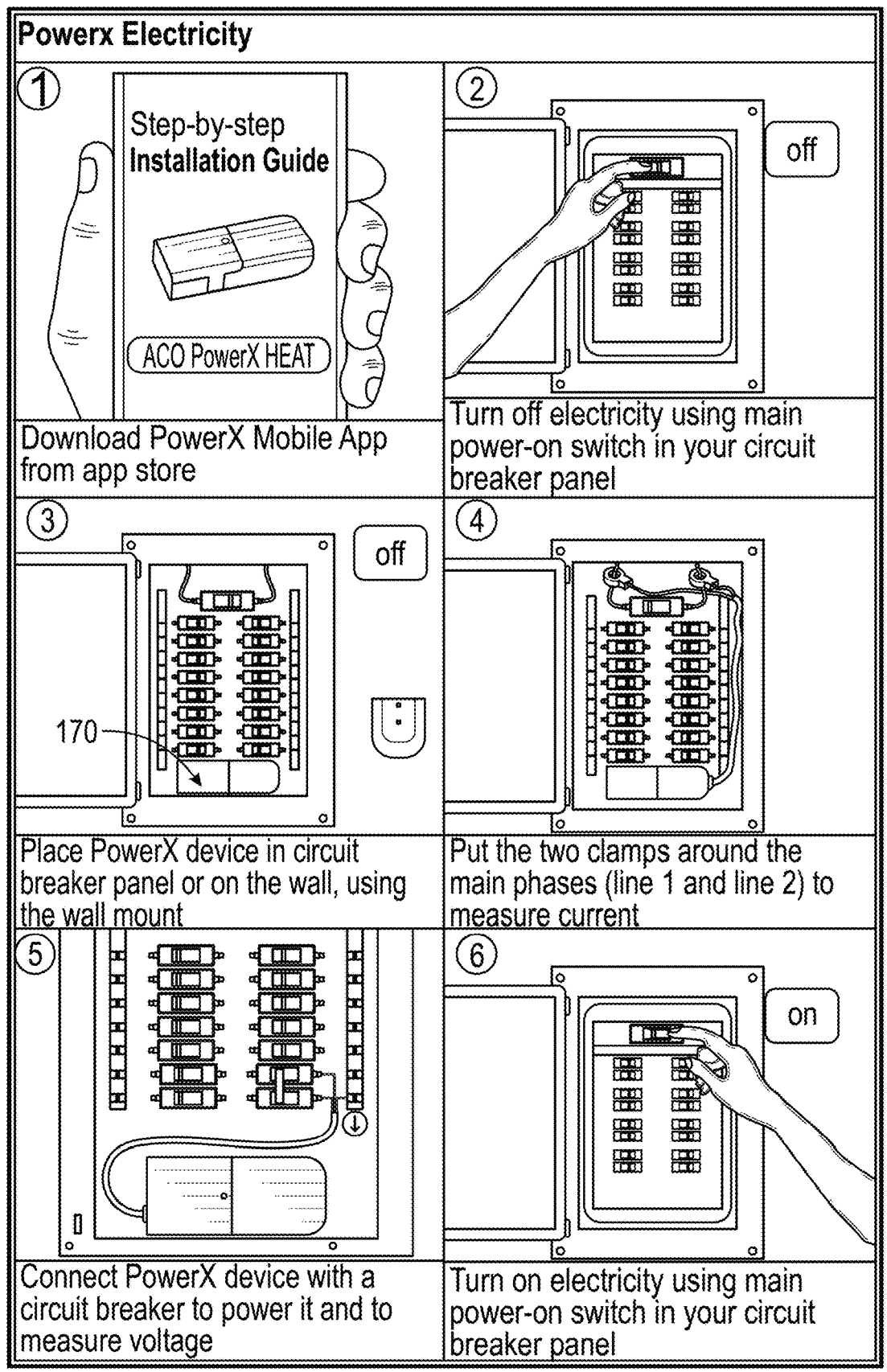
FIG. 3B illustrates installation of an electricity sensor device used with the utility monitoring and utility usage determination, control and optimization system.

FIG. 3B illustrates installation of an electricity sensor device 170 used with the utility monitoring and utility usage determination, control and optimization system. Power to the household should be turned off during installation. The electricity sensor device 170 may be installed inside or outside of the electricity panel. Clamps are placed around the two electrical mains and connect to the electricity sensor device 170. The electricity sensor device may be powered by connecting the device to a circuit in the electric panel. After the electricity sensor device 170 is installed, the power may be turned on. The clamps measure the electric current of the two electrical mains (three electric mains L1, L2, L3 for some households, particularly in European setup). The electricity sensor device 170 may transmit electric current data obtained by the clamps to the hub device 150. For example, the electricity sensor device 170 provides a manner of monitoring electricity usage by using an external magnetic pulse sensor that may read electrical current at a rate of over 1 million times (or samples per second). Furthermore, additional clamps may be included connected to the electricity sensor device and a solar panel system to obtain information regarding the current flow of a solar panel system. This can be paired with the water heater sensor device 180. This pairing allows the system to ensure that current supplied by the solar panel system is primarily stored as thermal energy in the water heater (i.e., running the water heater when solar delivers current) as this is cheaper and more efficient than feeding over-supply solar current into the grid.

The electricity sensor device 170 may transmit information to the device hub 150. For example, the electricity sensor device 170 may transmit information related to voltage, amperage (up to a million times per second, and from 2 or 3 phases, and optionally 2 or 3 solar phases), hertz, waveform and error code information. The electricity sensor device 170 collects the voltage from a household/electric panel with an electrical connection (such as wiring) from the electricity sensor device 170 to a circuit breaker. The electricity sensor device measures the amperage flowing through in different phases form the electrical panel using the clamp meters.

Figure 6C:
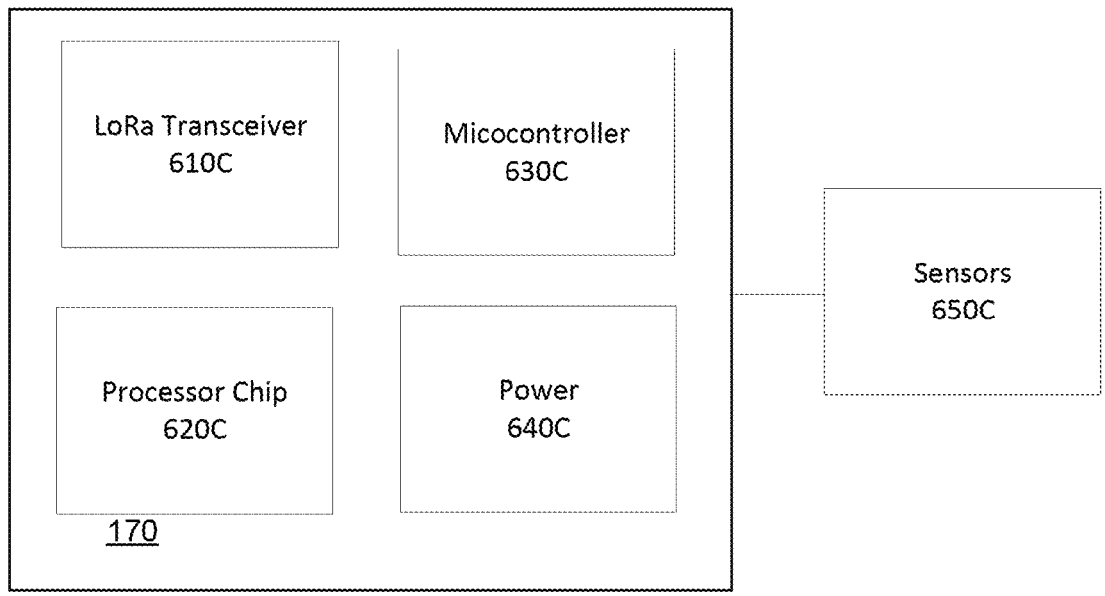
FIG. 6C illustrates an example block diagram of an electricity sensor device used with the utility monitoring and utility usage determination, control and optimization system.

Referring now to FIG. 6C, discussion of the electricity sensor device 180 may aid in the understanding of the electricity sensor device 180 operation. FIG. 6C illustrates an example block diagram of an electricity sensor device 170 used with the utility monitoring and utility usage determination, control and optimization system. In one embodiment, the electricity sensor device 170 may be configured with a LoRa radio 610C, a processor chip 620C, a Microcontroller 630C, power supply 640C, and electricity usage sensors 650C. Electricity usage sensors 650C as described herein are interconnected with the electricity sensor device 180.

The electricity sensor device 170 draws electricity at 120 or 240 volts directly from the circuit breaker to which leads are attached and transforms it down to <5V. A LoRA chip communicates with the hub device, and the LoRa chip is connected to an internal PCB antenna. The LoRa chip is further connected to 2-6 clamps via cable (Molex connector). Sensor clamps may be placed around the electricity panel main lead wiring. The clamps measure electric current by being clamped around the main phases (and solar, if applicable). The Lora chip further is connected to a voltage sensor to get the voltage from the circuit breaker, via connected wiring, and to the transformer that steps down the circuit breaker voltage. The processor chip 620C may process obtained sensor data. The LoRa chip sends the temperature data to the hub device 150.

Water Heater Sensor Device Installation and Operation

Figure 3C:
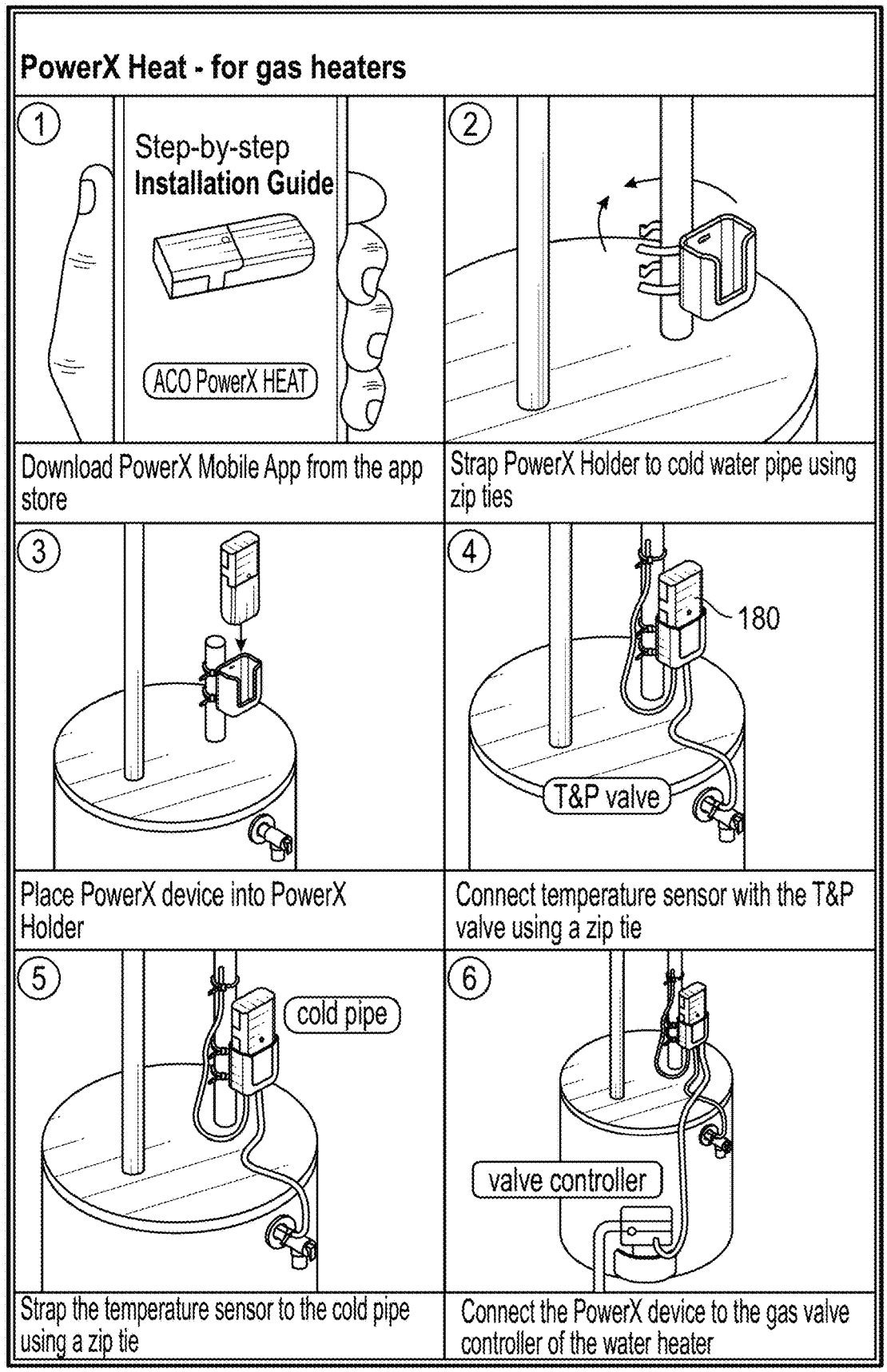
FIG. 3C illustrates installation of a water heater sensor device used with the utility monitoring and utility usage determination, control and optimization system.

FIG. 3C illustrates installation of a water heater sensor device 180 used with the utility monitoring and utility usage determination, control and optimization system. As depicted the water heater sensor device 180 is installed for monitoring heat usage from an electric water heater. Power to the household should be turned off during installation for electric heaters and power-vented gas heaters, and for standard gas heaters switching off power is optional. The water heater sensor device 180 may be attached to the water heater. A first temperature sensor may be attached (e.g., slid between the insulation of the tank and) to the Temperature and Pressure relief (T&P) valve of the water heater. A second temperature sensor is attached to the cold water pipe going into the water heater. A third temperature sensor may be attached to the hot water pipe going out of the water heater. The circuit breaker may be turned back on after installation (for electric and power-vented gas heaters). The water heater sensor device 180 for electric heaters is powered by the same electricity source that feeds current to the electric heater. The water heater sensor device 180 may transmit temperature data obtained by the first, second and optionally third temperature sensors to the hub device 150. For electric heaters, the water sensor device 180 receives voltage and amperage information from the wire going to the electric heater (which is also how the electric heater is controlled by the water heater sensor device 180, through a relay being able to turn it on/off).

for gas heaters, it receives data from the gas controller (and controls it via the controller)

Figure 3D:
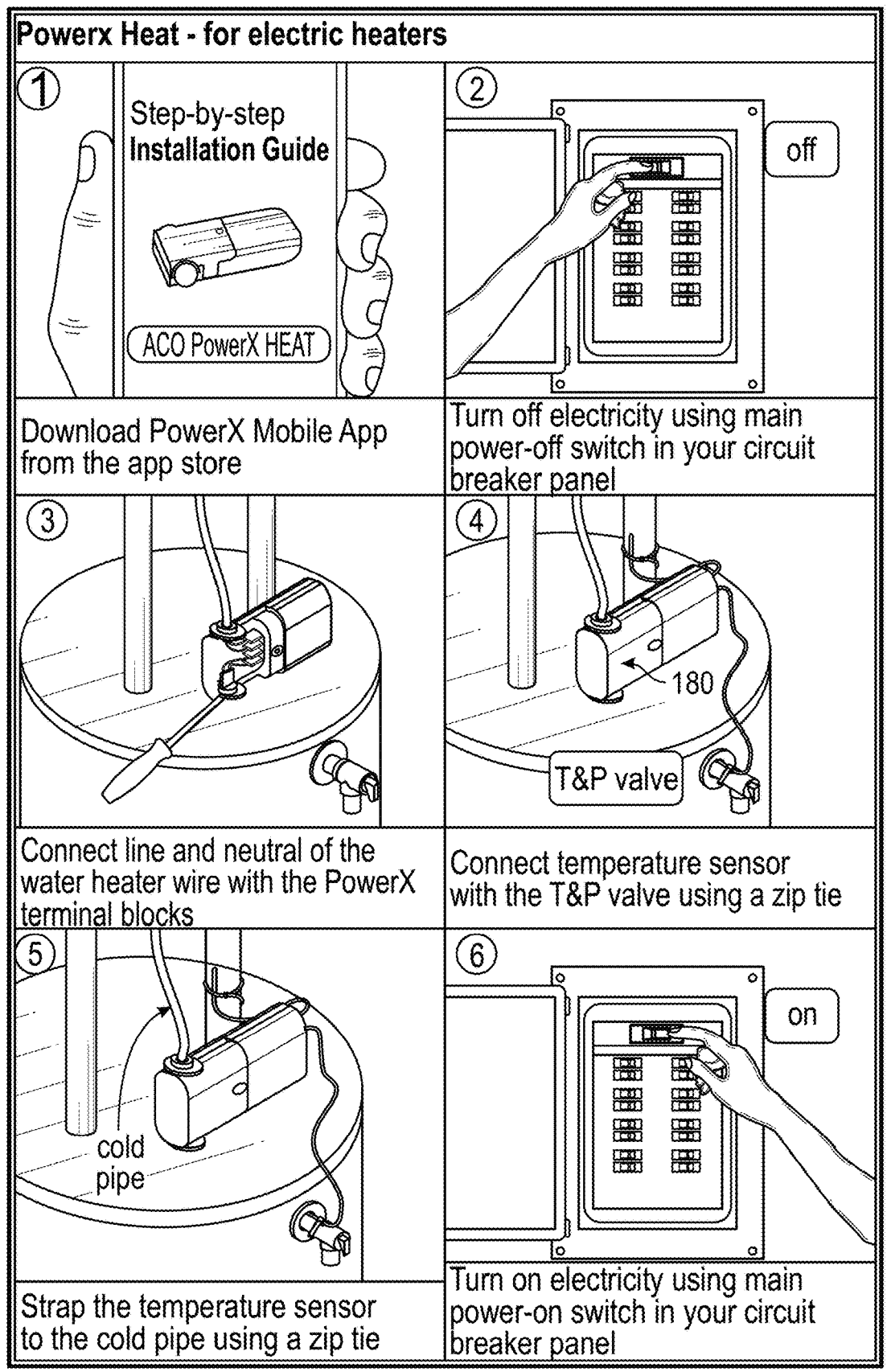
FIG. 3D illustrates installation of a water heater sensor device used with the utility monitoring and usage determination, control and optimization system.

FIG. 3D illustrates installation of a water heater sensor device 180 used with the utility monitoring and usage determination system. As depicted the water heater sensor device 180 is installed for monitoring heat usage from a gas water heater. The water heater should be unplugged if it is a power-vented model. The water heater sensor device 180 may be attached to the water heater. A second temperature sensor is attached to the cold water pipe going into the water heater. A third temperature sensor may be attached to the hot water pipe going out of the water heater. The water heater sensor device 180 may be attached to the water heater valve controller, obtain data and send queries and tasks to the controller. The water heater sensor device 180 may be powered by an external power source or an onboard power source such as batteries.

Figure 3E:
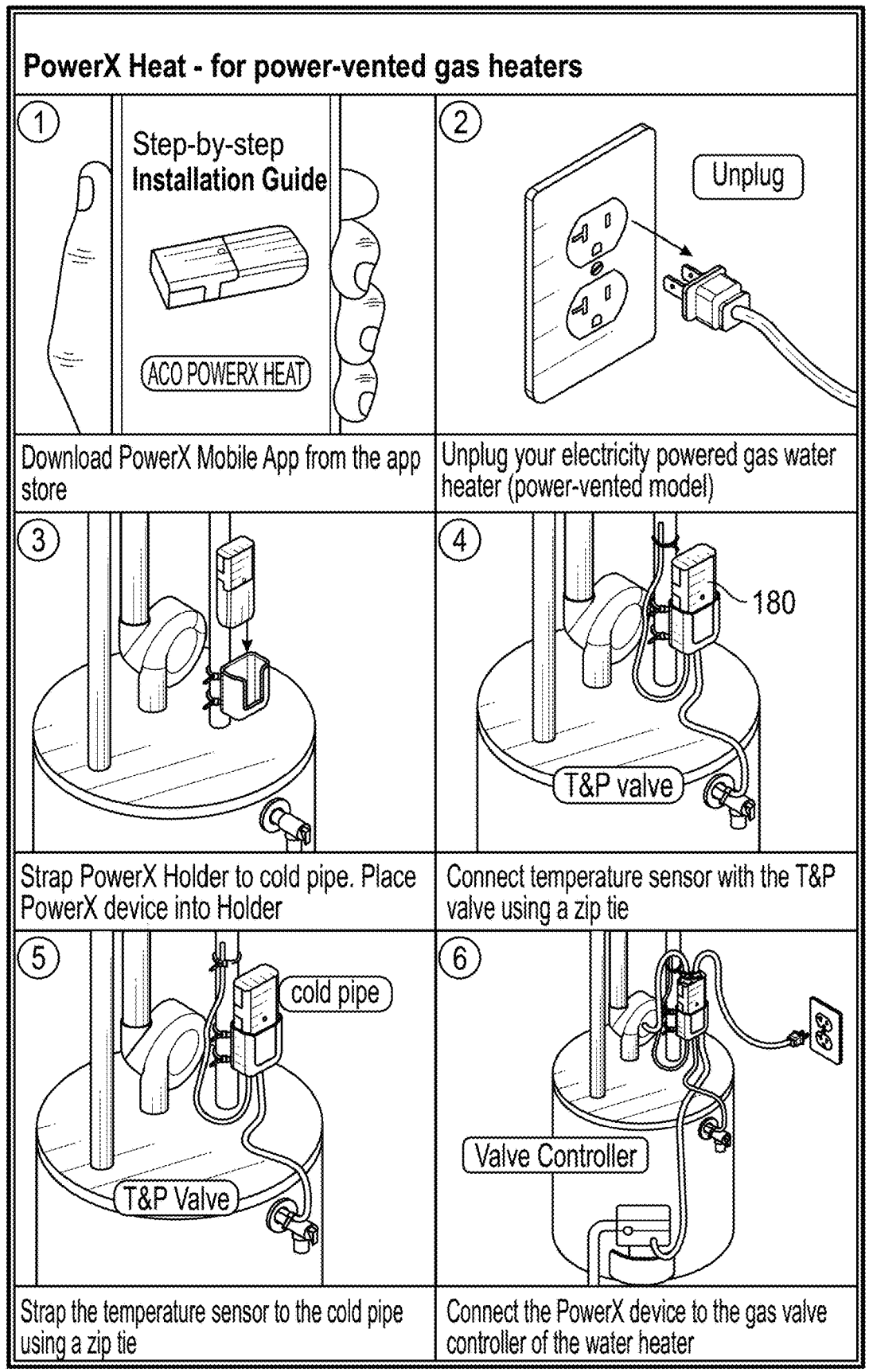
FIG. 3E illustrates installation of a water heater sensor device used with the utility monitoring and usage determination, control and optimization system.

FIG. 3E illustrates installation of a water heater sensor device 180 used with the utility monitoring and usage determination system. As depicted the water heater sensor device 180 is installed for monitoring heat usage from a gas water heater.

Figure 4B:
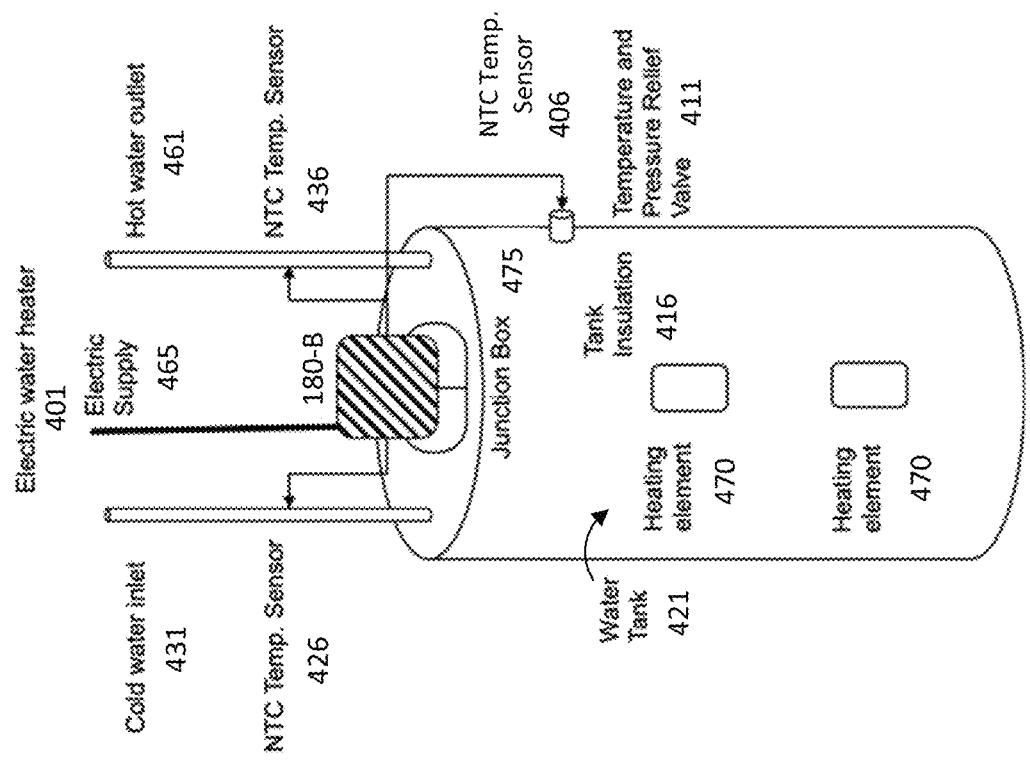
FIG. 4B illustrates installation of a water heater sensor device used with the utility monitoring and usage determination, control and optimization system.
Figure 4A:
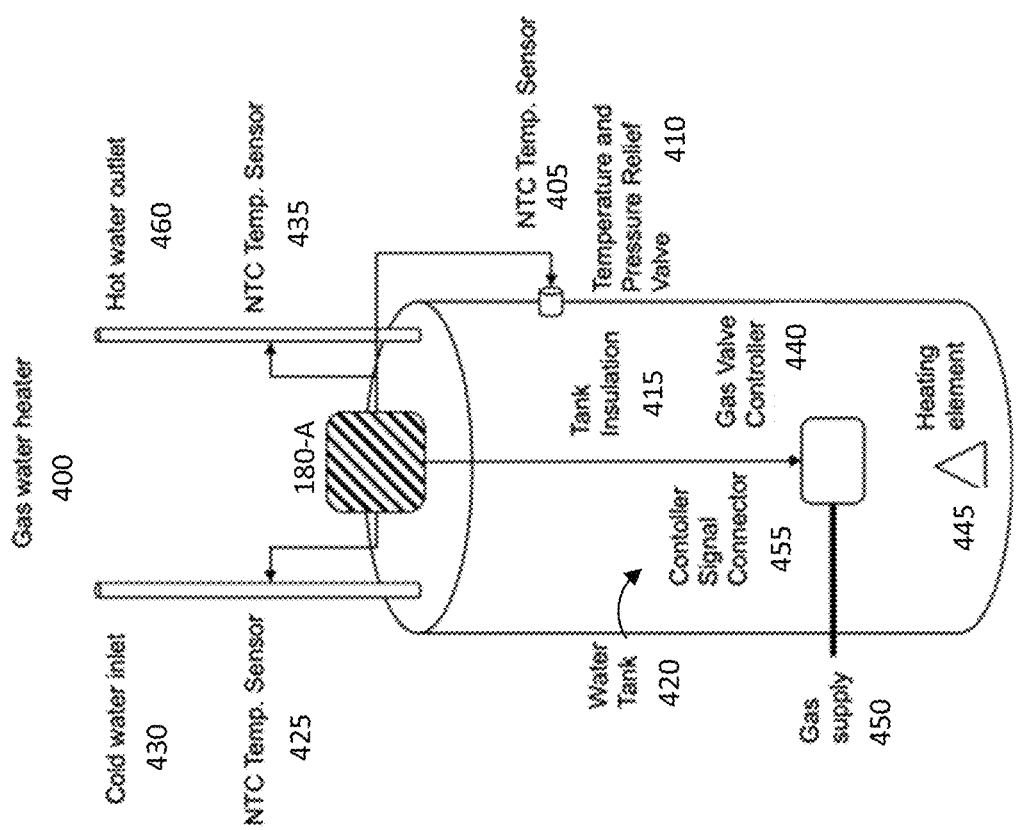
FIG. 4A illustrates installation of a water heater sensor device used with the utility monitoring and usage determination, control and optimization system.

FIGS. 4A and 4B illustrate configuration of a water heater sensor device 180 used with the utility monitoring and usage determination system. To supply hot water, water is heated in a water heater tank through a heating element, which may be heated by electric current or gas. When the hot water is withdrawn by a user, for example through a shower, new cold water is drawn into the water tank and heated up.

From the measured temperatures, the system 100 is able to calculate the volume of and the according energy spent on the hot water used. Based on the measurements, the system 100 may control the water heater to adjust on and off cycles of the water heater, thereby achieving significant energy and cost savings. The system 100 may save energy and cost from water heating by: (i) lowering the desired temperature of the hot water (adjusting the thermostat), (ii) turning off the heater (e.g. during vacations when no hot water is needed), (iii) focusing heating cycles on temperature brackets that are more efficient, (iv) focusing heating cycles to better coincide with user demand or times when electricity cost are low, and/or (v) focusing heating and stop cycles on times when there is over-/undersupply of electricity/gas in the grid so as to help load balance the grid.

The water heater sensor device 180 provides measurement and monitoring of thermal energy consumption for electric water heaters through external negative-temperature-coefficient or digital temperature sensors. The water heater sensor device 180 may also provide measurement and monitoring of thermal energy consumption for gas water heaters through external negative-temperature-coefficient sensors or digital temperature sensors. Also, the water heater sensor device 180 may provide measurement and monitoring of thermal energy consumption for gas water heaters through a gas valve controller signal.

The water heater sensor device 180 can derive temperature information within a tank of the water heater as well as information about heating times and patterns by measuring temperature with exterior temperature sensors. These temperature sensors may be attached to the water heater tank, the cold water inlet of the water heater and the hot water outlet of the water heater. The temperature sensors do not require contact with the water body, but rather the system 100 may rely on an algorithm that is able to distill the water temperature from the various temperature influencers, such as ambient temperature and insulation.

The water heater sensor device 180 may provide control of electric water heaters by regulating electricity supply based on optimization algorithms trained with local data. The water heater sensor device 180 may provide for control of gas water heaters by regulating gas supply based on optimization algorithms trained with local data. The water heater sensor device 180 may automatically adjust temperature and heat cycle times thereby providing significant cost savings. The water heater sensor device 180 may control the water heater either through a relay for electric water heaters or through communicating via the standard protocol of gas water heaters.

The water heater sensor device 180 may calculate thermal energy usage through the use of external negative-temperature-coefficient temperature sensors and/or temperature readings from the gas valve for gas heaters. Furthermore, relying on machine learning algorithms it can achieve a high level of measurement accuracy. Also, the water heater sensor device 180 may provide for significant energy saving by learning and adjusting temperatures to the needs of a user and by turning off the water heater when no hot water is needed (e.g. when user is on vacation).

The water heater sensor device 180 offers significant opportunities for utility companies and grid load balancing. For example, a standard electric water heater in the United States consumes 4 to 5 Kilowatt and may—over a daily heating time of 3 hours—take more than 10 Kilowatt hours of electric load (converted into thermal energy). The water heater sensor device 180 may activate and deactivate this load at any time. This system functionality provides for utility companies to increase or decrease the load on their electric grid to smooth and match supply and demand of electricity.

Water Heater Sensor Device Operation with a Gas Water Heater

Referring to FIG. 4A, in one embodiment for a gas water heater (400), the water heater sensor device 180-A may be connected to multiple temperature sensors to obtain temperature information from the gas water heater. A first negative-temperature-coefficient (NTC) temperature sensor 405 may be connected to Temperature and Pressure (T&P) Relief Valve 410. Temperature sensor 405 may be epoxy coated and may have a circular footprint of a dimeter of less than 3 mm to fit in between tank insulation 415 of the water heater 400 and the pipe of the (T&P) Relief Valve 410. Temperature sensor 405 measures the temperature inside the water tank 420. A second temperature sensor NTC 425 may be connected to the cold water inlet pipe 430. Temperature sensor 425 measures the temperature of the cold water flow to predict heating cycles. A third NTC temperature sensor 435 may be connected to the warm water outlet pipe 460. This increases the accuracy of the water heater sensor device 180 to predict heating cycles and water temperature inside the tank 420. As used herein, any suitable temperature sensor may be used with the water heater sensor device 180 to obtain temperature information, such as NTC thermistors, PTC thermistors, and/or digital sensors.

A Controller Signal Connector 455 of the water heater 400 may obtain other temperature data values and may obtain other data from the gas valve controller 440 via the standard protocol of the gas valve controller 440. For example, the gas valve controller may have circuity that collects data about the water heater 400. The Controller Signal Connector 455 may regulate the heating element 445 by controlling the opening status of the gas supply 450 pipe through the gas valve controller 440 using the same standard protocol.

The water heater sensor device 180-A collects the temperature data from temperature sensors 405, 425 and 435, and may collect other data from a connection to an interface of the gas valve controller 440 through the Controller Signal Connector 455. The information may be transmitted via the water heater sensor device 180-A to the hub device 150 and to the system 100 either through direct connection with the interne.

Water Heater Sensor Device Operation with an Electric Water Heater

Referring to FIG. 4B, in one embodiment for a gas water heater (400), the water heater sensor device 180-A may be connected to multiple temperature sensors to obtain temperature information from the gas water heater. A negative-temperature-coefficient (NTC) temperature sensor 406 may be connected to Temperature and Pressure (T&P) Relief Valve 411. The NTC temperature sensor 406 may be epoxy coated and may have a circular footprint of a dimeter of less than 3 mm to fit in between the insulation 416 of the water heater 401 and the pipe of the (T&P) Relief Valve 411. Temperature sensor 406 measures the temperature inside the water tank 421. A further temperature sensor NTC 426 may be connected to the cold water inlet pipe 431. Sensor NTC 426 measures the flow of cold water to predict heating cycles. A third NTC temperature sensor 436 may be connected to the warm water outlet pipe 461. This increases the accuracy of the water heater sensor device 180 to predict heating cycles and water temperature inside the tank. Any suitable temperature sensor may be used with the water heater sensor device 180-A to obtain temperature information, such as NTC thermistors, PTC thermistors, digital sensors.

The water heater sensor device 180-B collects the temperature data from the temperature sensors 406, 426, 436. The water heater sensor device 180-B may collect data on Voltage, Amperage and heating cycles from the electric supply 465. The water heater sensor device 180-B may be installed such that it can break the direct electric supply 465 to the Junction Box 475 through an internal relay. The Electric Heater Controller 456 may transmit data to an external server or service (such as system 100) either through direct connection with the internet or via an additional hub, such as hub device 150.

Figure 6D:
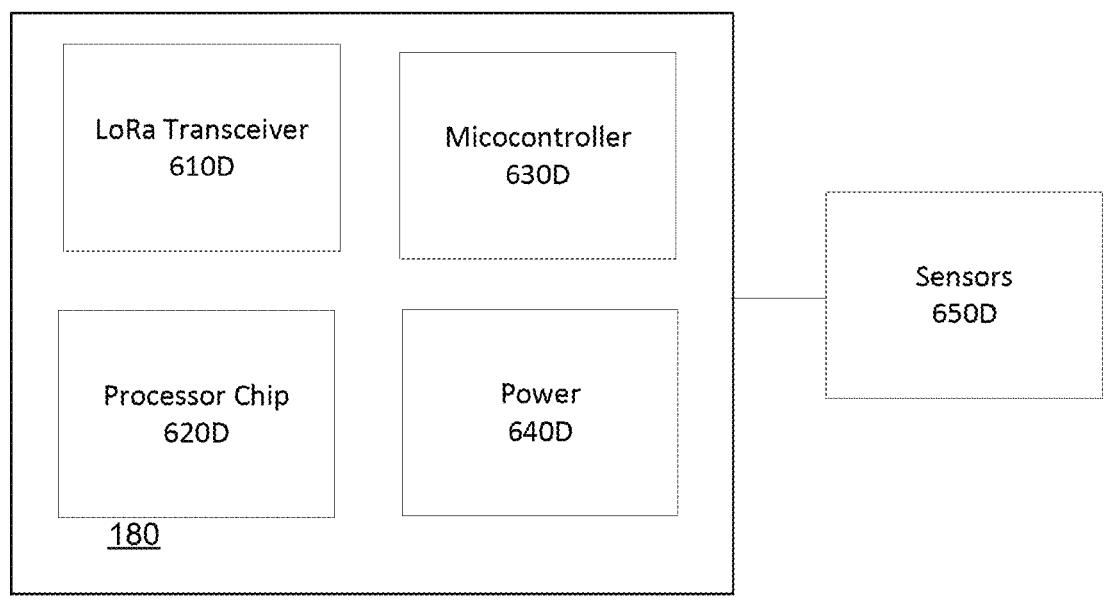
FIG. 6D illustrates a block diagram example of a water heater sensor device used with the utility monitoring and utility usage determination, control and optimization system.

Referring now to FIG. 6D, discussion of the water heater sensor device 180 may aid in the understanding of the water heater sensor device 180 operation. FIG. 6D illustrates an example block diagram of a water heater sensor device 180 used with the utility monitoring and utility usage determination, control and optimization system. The water heater sensor device 180 may be installed with a gas water heater or an electric water heater. In one embodiment, the water heater sensor device 180 may be configured with a LoRa radio 610D, a processor chip 620D, a Microcontroller 630D and a power supply 640D. Temperature sensors 650D as described herein are interconnected with the water heater sensor device 180.

The water heater sensor device 180 when installed with a gas water heater draws electricity (<5V) from batteries or a USB adapter. A LoRA chip communicates with the hub device 150, and is connected to an internal PCB antenna. The LoRa chip is further connected with 2-3 PT or NTC or digital temperature sensors via cable (Molex connector). The LoRa chip is further connected to a TX/RX/GROUND (IRDA) cable (Molex connector) that may send and receive data from/to the gas valve controller of the water heater. The LoRa chip may further receive data from a water leak sensor cable connected via Molex connector.

Various information about the gas water heater be obtained by the water heater sensor device 180 and transmitted to the hub device 150. Many gas water heaters have a controller that provides information about the gas water heater, and other gas water heaters do not. Gas water heaters, for example, have a gas valve controller that can be read for data about the gas water heater. Data obtained by the water heater sensor device 180 may include actual water temperature inside the water heater tank (as sensed by internal temperature probe), adjusted water temperature inside tank (temperature probe adjusts for conditions and misreadings), ambient temperature, set desired temperatures of the water heater by the user, heating requests to heat water, ignition burner valve voltage, thermopile condition, Controller PCB voltage, error codes, codes sent by the system to the controller (e.g. code to start or stop heating or to set a different max. temperature), battery load status, water leak detection measured by a copper cable that spins down the water heater, gas density to estimate any form of gas (LPG, Natural Gas, Town Gas, Carbon Monoxide, Coal Gas, Liquefied Gas) in the atmosphere indicating a gas leak, and/or temperature sensor data from the temperature sensors placed about the water heater (e.g., about the relief valve (to estimate tank temperature), on the cold water pipe, and/or the hot water pipe).

The water heater sensor device 180 when installed with an electric water heater draws electricity (<5V) from batteries or a USB adapter. A LoRA chip communicates with the Hub, and the LoRA chip is connected to an internal PCB antenna. The LoRa chip is further connected with 2-3 PT or NTC or digital temperature sensors via cable (Molex connector). The LoRa chip is further connected to a TX/RX/GROUND (IRDA) cable (Molex connector) that may send and receive data from/to the gas valve controller of the water heater. The LoRa chip may further receive data from a water leak sensor cable connected via Molex connector. The processor chip 620D may process obtained sensor data.

In one configuration, the water heater sensor device 180 when installed with an electric water heater draws electricity at 120 or 240 volt from the wire connecting the water heater sensor device 180 to the electric water heater and transforms it down to <5V. A LoRA chip communicates with the Hub, and is connected to an internal PCB antenna. The LoRa chip is further connected with 2-3 PT or NTC or digital temperature sensors via cable (Molex connector). The LoRa chip is further connected to a voltage and amperage sensor (on PCB). The sensors measure the electric current flowing in the wire to the electric heater. The LoRa chip is further connected to a relay. The relay can stop the current flow to the electric heater. The LoRa chip may further receive data from a water leak sensor cable connected via Molex connector.

Various information about the electric water heater be obtained by the water heater sensor device 180 and transmitted to the hub device 150. For example, the water heater sensor device 180 may obtain temperature sensor data from the temperature sensors placed about the water heater (e.g., about the relief valve (to estimate tank temperature), on the cold water pipe, and/or the hot water pipe). Additionally, the water heater sensor device 180 may obtain water heater voltage, amperage, relay control status (e.g., opened/closed), and water leak occurrence which may be measured with a copper cable that spins down the water heater.

Utility Monitoring and Usage Determination Process Overview

Figure 5:
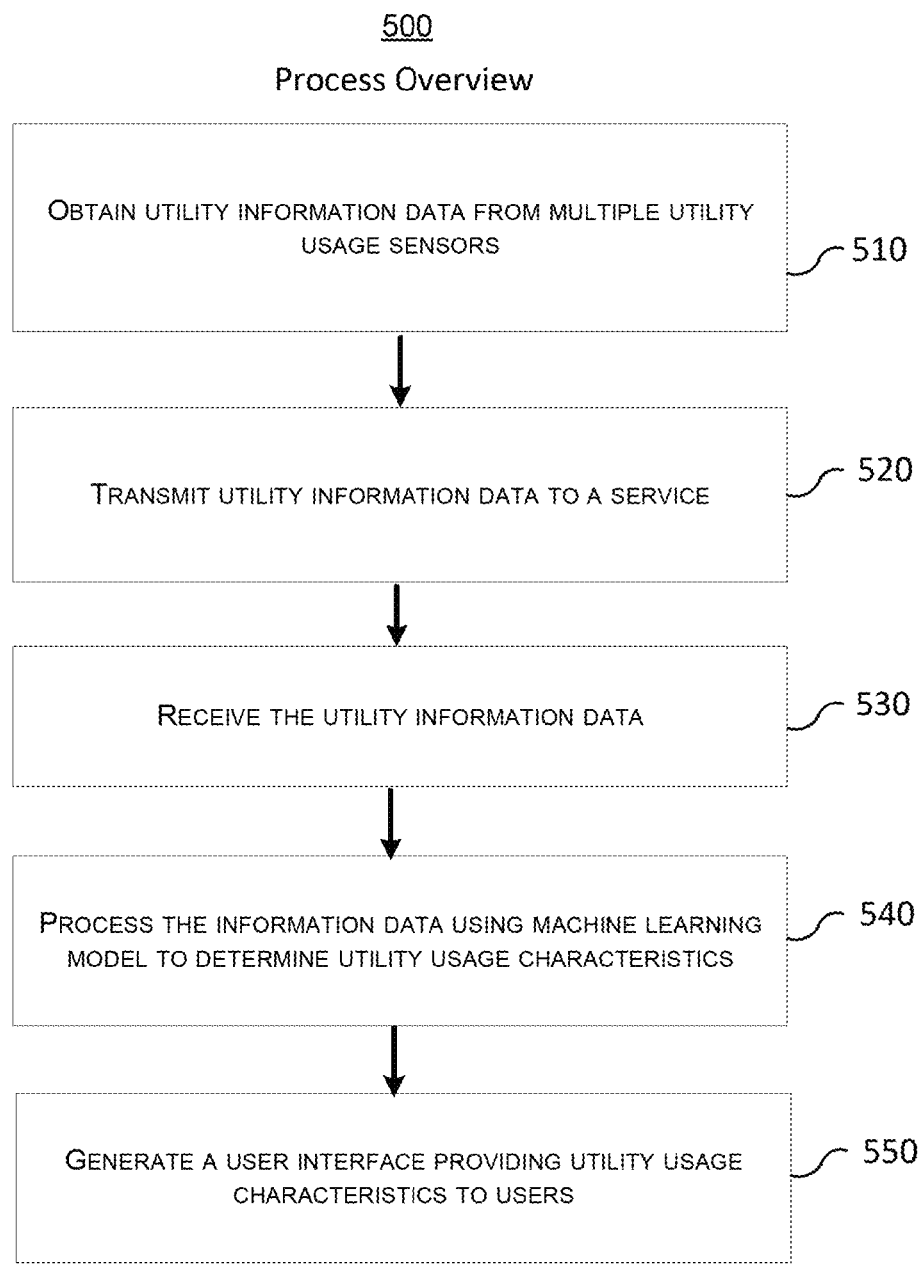
FIG. 5 illustrates an example of an overview of a process for utility monitoring and utility usage determination.

FIG. 5 illustrates an example of an overview of a process 500 for utility monitoring and utility usage determination. The hub device 150 receives data from sensor devices 160, 170, 180 that have been installed to obtain respective utility information data (step 510). The hub device may transmit the utility information to a service (such as the system 100) (step 520). The system 100 receives the utility information data from respective hub devices 150 (step 530). The system 100 stores and processes the received utility information data associating the data with respective user account. The system 100 processes the utility information data using one or more machine learning models to determine utility usage characteristics (step 540). The system 100 generates one or more user interfaces providing usage characteristics (step 550).

Example Water Usage User Interfaces

Figure 7A:
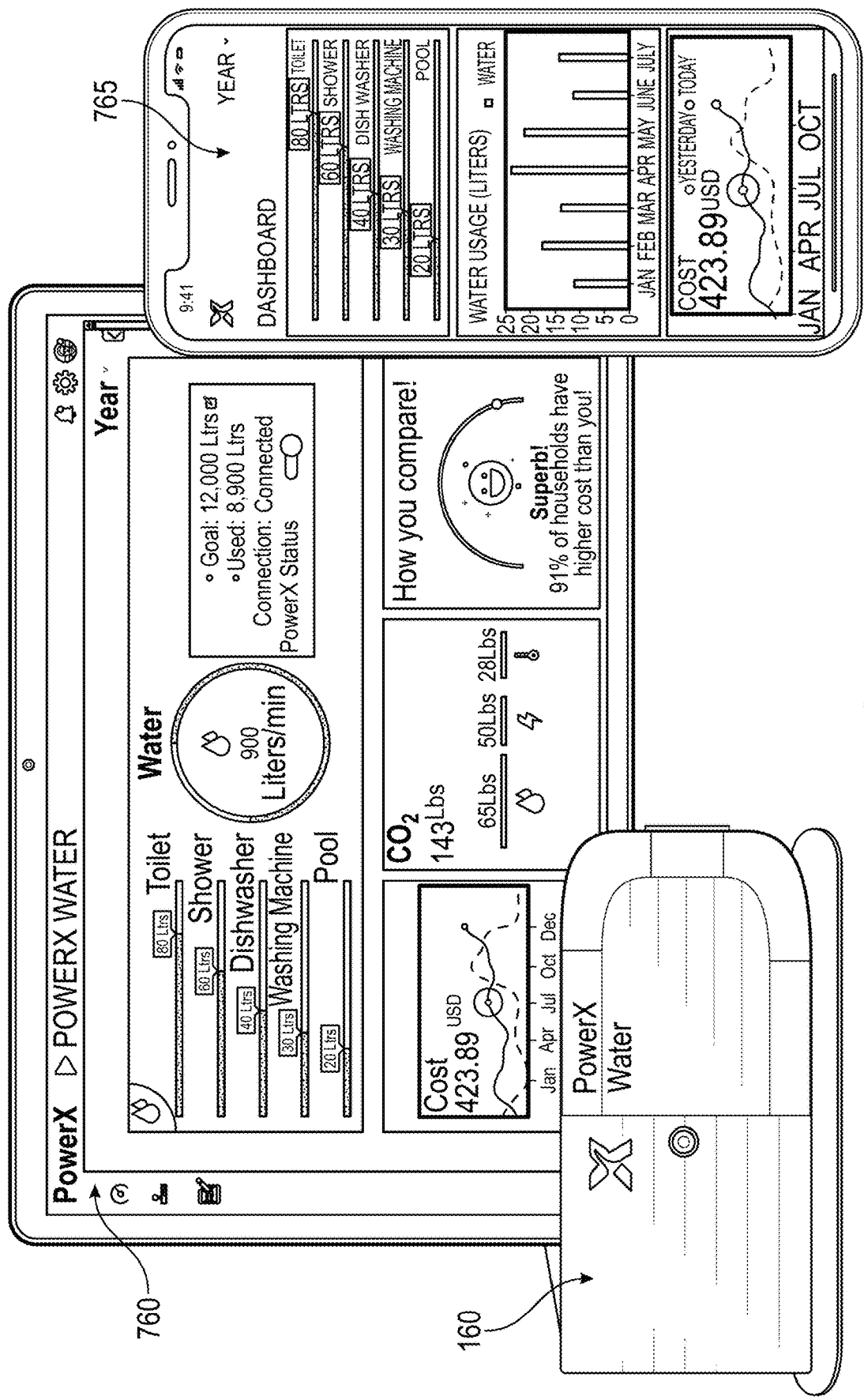
FIG. 7A illustrates example user interfaces according to one embodiment of the present disclosure.

Referring now to FIG. 7A, a discussion of system 100 generated user interfaces related to the sensor data obtained by the water sensor device 160 are described. FIG. 7A illustrates example user interfaces 760, 765 according to one embodiment of the present disclosure. The user interfaces 760, 765 may be generated by the user interface module 116 and in conjunction with the application engine 142 and be displayed as user interface 144. The user interfaces 760, 765 may display heat utilization information from the data collected by an electricity sensor device 160. After a sensor device 160 is added the system 100 may receive utility usage data via the data acquisition module 106. The data processing module 112 may determine cost information, carbon dioxide emission, comparison of utility usage to other users, a timeline of utility usage, largest consumption, and water usage.

The user interfaces 760, 765 may display the different types of water usages. For example, the system 100 may determine and generate a user interface displaying water usage information for devices, appliances and/or water outlets, such as a toilet, shower, dishwasher, washing machine, pool, etc.

The user interface 760, 765 may display cost information for the water usage depicting such usage over a time-based period, such as days, months or years. The system 100 may calculate water usage costs based on determination of the water volume used as to cost data per volume of water used. The system 100 may also receive user input indicating the actual water usage used and the actual cost for the actual water usage (e.g., data input from a utility bill). The system 100 then may use this information to calibrate the water sensor device 160. The system 100 may generate energy/cost saving suggestions via a machine learning algorithm, and display via the user interface an example of how to implement the energy/cost saving suggestions via user interface 760, 765.

The user interface 760, 765 may display actual or current water usage, such as liters or gallons per minute. The user interface 760, 765 may display a goal represented by a graphical circular ring representing the portion of the goal achieved. A usage goal may be input by a user describing a maximum amount of water to be used within a period of time such as a month. The system will monitor and report the actual water usage as to the usage goal. The user interface 760, 765 may display the water usage goal and the amount of water used within the goal time period. The system 100 may generate and send notifications to a user when a percentage of user goal has been reached.

The user interface 760, 765 may display the connection status and the signal strength of the LoRa wireless signal of the water sensor device 160.

The user interface 760, 765 may display the amount of carbon dioxide emission of the household based on an evaluation by the system of the utility information as compared to emissions tables and data correlated to utility usage.

The system may determine how a particular household compares to other households within a geographic area. The user interface 760, 765 may display a graph or other information depicting how the user's household compares to other households within a predetermined geographic region or location. For example, the user interface may display a determined percentage of how the user's household costs compare to other households.

Example Electricity Usage User Interfaces

Figure 7B:
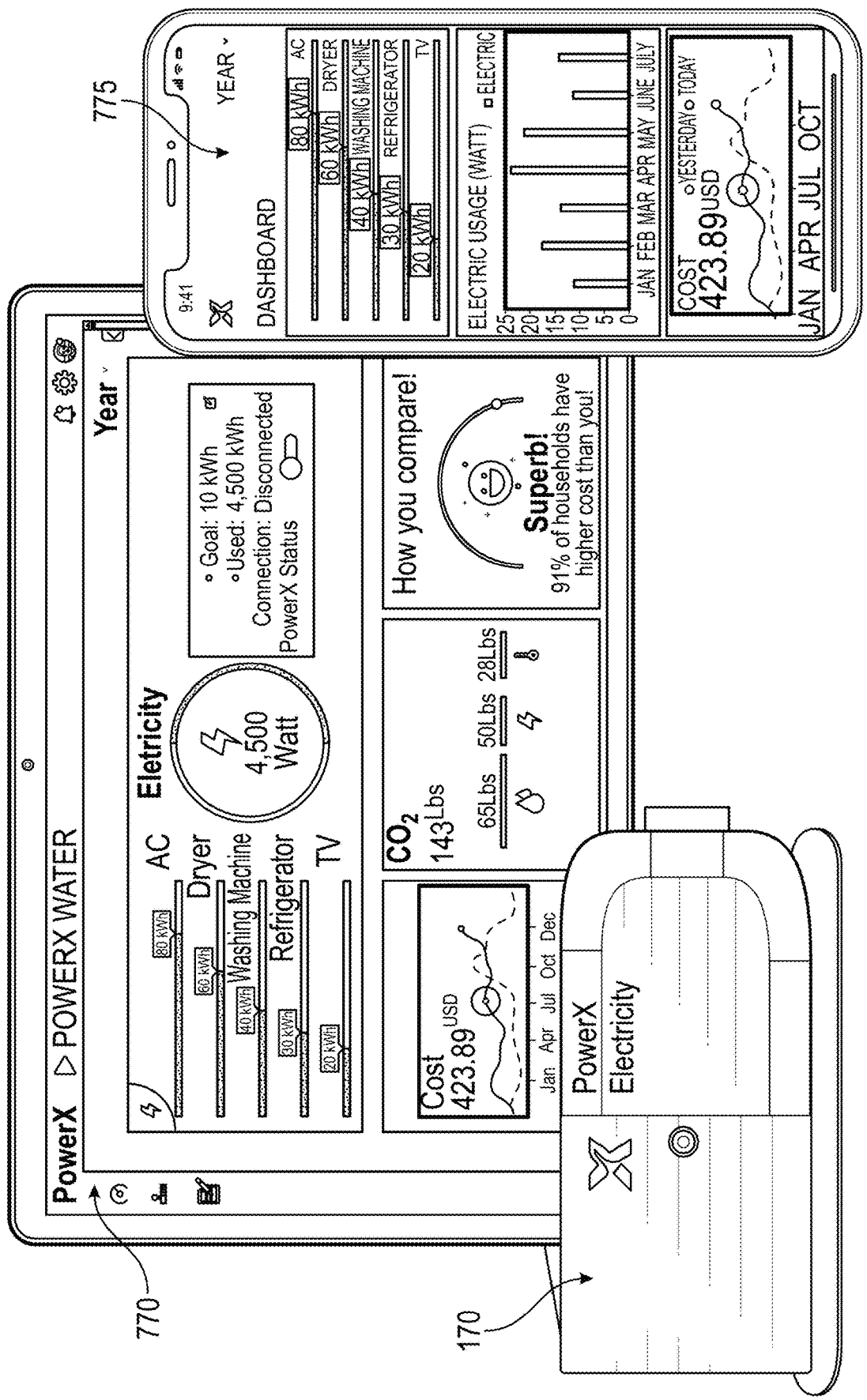
FIG. 7B illustrates example user interfaces according to one embodiment of the present disclosure.

Referring now to FIG. 7B, a discussion of system 100 generated user interfaces related to the sensor data obtained by the electricity sensor device 170 are described. FIG. 7B illustrates example user interfaces 770, 775 according to one embodiment of the present disclosure. The user interfaces 770, 775 may be generated by the user interface module 116 and in conjunction with the application engine 142 and be displayed as user interface 144. The user interfaces 770, 775 may display electricity utilization information from the data collected by an electricity sensor device 170. After a sensor device 170 is added the system 100 may receive utility usage data via the data acquisition module 106. The data processing module 112 may determine cost information, carbon dioxide emission, comparison of utility usage to other users, a timeline of utility usage, largest consumption, and electricity usage.

The user interfaces 770, 775 may display the different types of electricity usages. For example, the system 100 may determine and generate a user interface displaying electricity usage information for devices or appliances, such as an air conditioner, dryer, washing machine, refrigerator, television, lighting, etc.

The user interface 770, 775 may display cost information for the electricity usage depicting such usage over a time-based period, such as days, months or years. The system 100 may calculate electricity usage costs based on determination of the electricity amount used as to cost data per unit (e.g., kWh) of electricity used. The system 100 may also receive user input indicating the actual electricity usage used and the actual cost for the actual electricity usage (e.g., data input from a utility bill). The system 100 then may use this information to calibrate the electricity sensor device 170. The system 100 may generate energy/cost saving suggestions via a machine learning algorithm, and displaying via the user interface an example of how to implement the energy/cost saving suggestions via user interface 770, 775.

The user interface 770, 775 may display actual or current electricity usage, such as kWh per minute or hour used. The user interface 770, 775 may display a goal represented by a graphical circular ring representing the portion of the goal achieved. A usage goal may be input by a user describing a maximum amount of electricity to be used within a period of time such as a month. The system will monitor and report the actual electricity usage as to the usage goal. The user interface 770, 775 may display the electricity usage goal and the amount of electricity used within the goal time period. The system 100 may generate and send notifications to a user when a percentage of user goal has been reached.

The user interface 770, 775 may display the connection status and the signal strength of the LoRa wireless signal of the electricity sensor device 170.

The user interface 770, 775 may display the amount of carbon dioxide emission of the household based on an evaluation by the system of the utility information as compared to emissions tables and data correlated to utility usage.

The system 100 may determine how a particular household compares to other households within a geographic area. The user interface 770, 775 may display a graph or other information depicting how the user's household compares to other households within a predetermined geographic region or location. For example, the user interface may display a determined percentage of how the user's household costs compare to other households. Based on the received sensor device the system 100 may also determine appliances or devices that may need maintenance due to determined inefficient operations.

Example Heat Usage User Interfaces

Figure 7C:
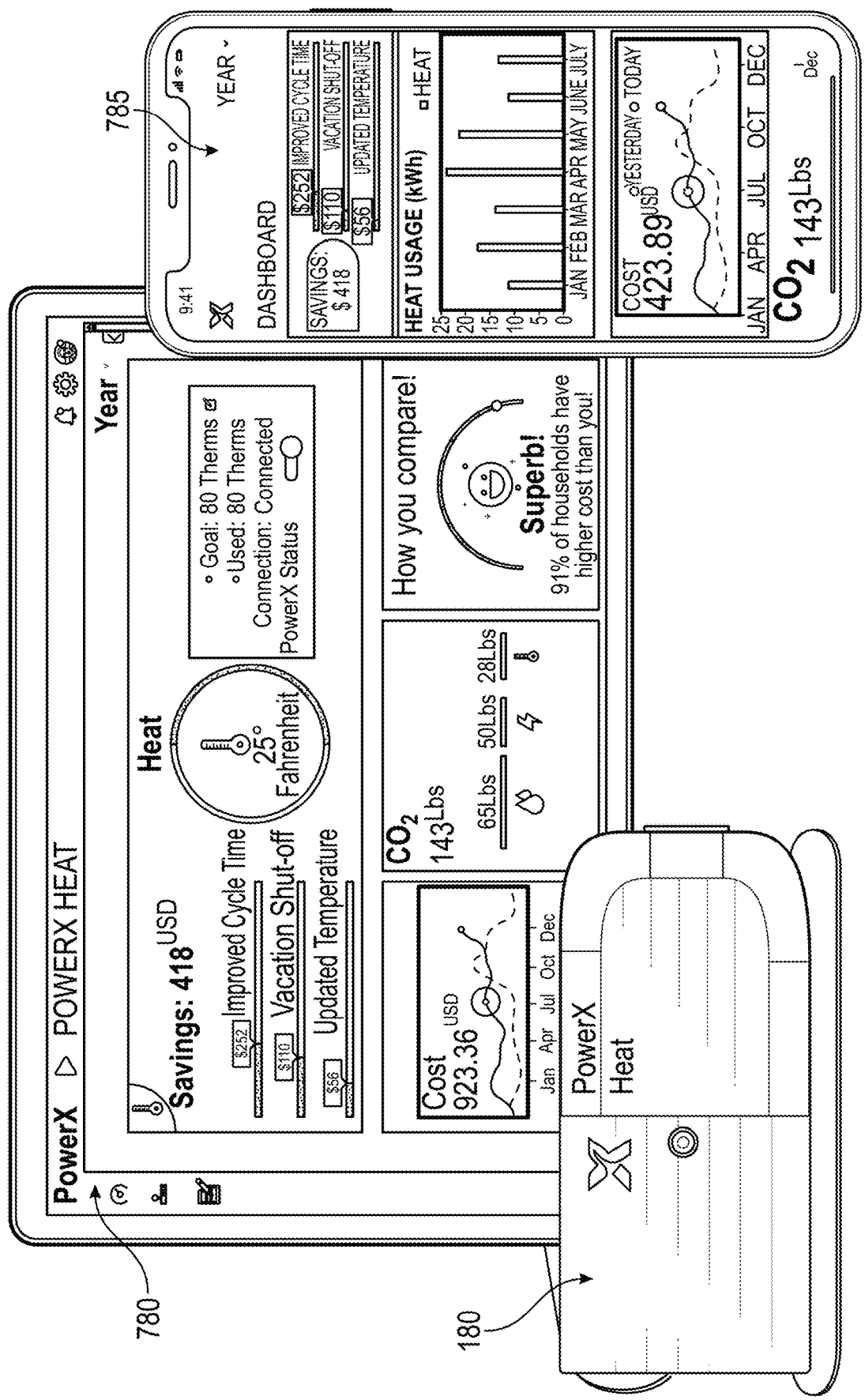
FIG. 7C illustrates example user interfaces according to one embodiment of the present disclosure.

Referring now to FIG. 7C, a discussion of system 100 generated user interfaces related to the sensor data obtained by the water heater sensor device 180 are described. FIG. 7C illustrates example user interfaces 780, 785 according to one embodiment of the present disclosure. The user interfaces 780, 785 may be generated by the user interface module 116 and in conjunction with the application engine 142 and be displayed as user interface 144. The user interface 780, 785 may display heat utilization information from the data collected by a water heater sensor device 180. After a water heater sensor device 180 is added the system 100 may receive utility usage data via the data acquisition module 106. The data processing module 112 may determine cost information, carbon dioxide emission, comparison of utility usage to other users, a timeline of utility usage, largest consumption, and energy and water usage.

The user interfaces 780, 785 may display the different information related to water heater usage. For example, the system 100 may determine and generate a user interface displaying heat usage information for a water heater. The user interfaces 780, 785 may also display savings related information as the control changes made by the system 100 as to operation of a water heater. For example, the user interface 780, 785 may display savings related to improved cycle time, vacation-shut off and/or updated temperature. The system 100 may generate energy/cost saving suggestions via a machine learning algorithm, and displaying via the user interface an example of how to implement the energy/cost saving suggestion (e.g. displaying a message that you had 3 appliances in standby mode for over 3 months, and you can save 5% if you switch these off completely).

The user interface 780, 785 may display cost information for the water heater utility usage depicting such usage over a time-based period, such as days, months or years. For example, the system 100 may calculate utility usage costs based on determination of the electricity and/or water amount used.

The user interface 780, 785 may display actual or current temperature value for the water heater, such as degrees in Fahrenheit or Celsius. The user interface 780, 785 may display a goal represented by a graphical circular ring representing the portion of the goal achieved. A usage goal may be input by a user describing a maximum amount of thermal units to be used within a period of time such as a month. The system will monitor and report the actual thermal usage as to the usage goal. The user interface 780, 785 may display the thermal usage goal and an amount of thermal units used within the goal time period. The system 100 may generate and send notifications to a user when a percentage of user goal has been reached.

The user interface 780, 785 may display the connection status and the signal strength of the LoRa wireless signal of the water heater sensor device 180.

The user interface 780, 785 may display the amount of carbon dioxide emission of the household based on an evaluation by the system of the utility information as compared to emissions tables and data correlated to utility usage.

The system 100 may determine how a particular household compares to other households within a geographic area. The user interface 770, 775 may display a graph or other information depicting how the user's household compares to other households within a predetermined geographic region or location. For example, the user interface may display a determined percentage of how the user's household costs compare to other households.

Moreover, the system 100 may determine that a water heater may need maintenance and/or is experiencing problems or inefficient operation. The user interface may display information about maintenance or operational issues. For instance, int the case of gas heaters, the user interface is able to display voltage and error status of the water heater, the thermopile (i.e., ignition burner), and whether there are any issues with the water heater.

Figure 7D:
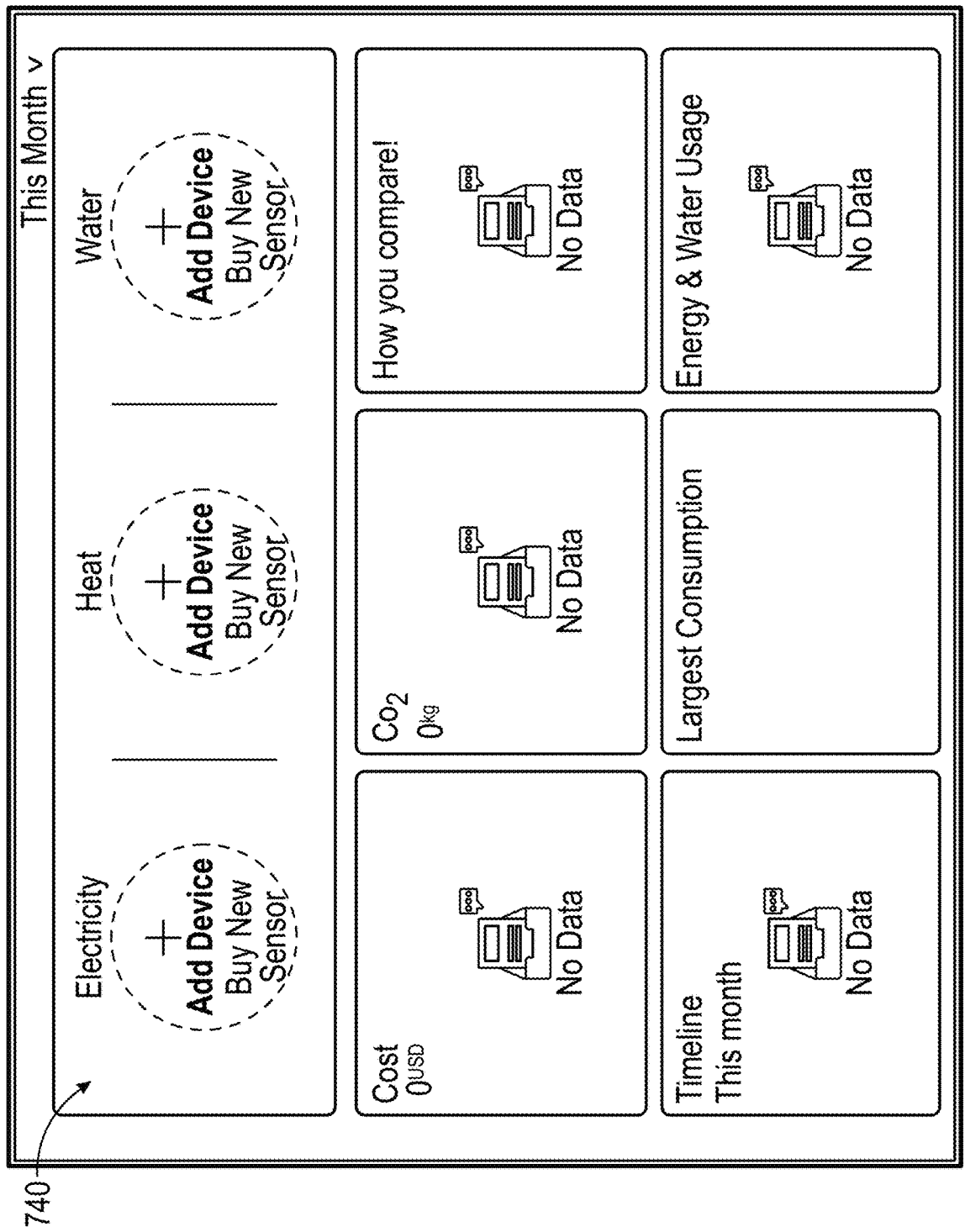
FIG. 7D illustrates an example user interface according to one embodiment of the present disclosure.

FIG. 7D illustrates an example user interface 740 according to one embodiment of the present disclosure. The user interface 740 may be generated by the user interface module 116 and in conjunction with the application engine 142 and be displayed as user interface 144. The user interface 740 provides functionality allowing a user to add and/or configure different sensor devices 160, 170, 180 to a user account. For example, via the device setup module 104, a user may setup and configure a sensor device. The user interface receives a selection of a sensor device to add. After a sensor device is added the system 100 may receive utility usage data via the data acquisition module 106. The data processing module 112 may determine cost information, carbon dioxide emission, comparison of utility usage to other users, a timeline of utility usage, largest consumption, and energy and water usage. For example, the timeline may be segmented into times of when outlets or appliances began running and were turned off, of if water was heated by a water heater, or whether an error occurred, or whether a device seems to need maintenance, etc. (E.g., the timeline may show a shower started at 4 p.m., ran for 10 minutes, and a coffee machine started at 4:10 p.m., and ran for 2 minutes.)

Water Leak Determination and User Notification

Figure 7E:
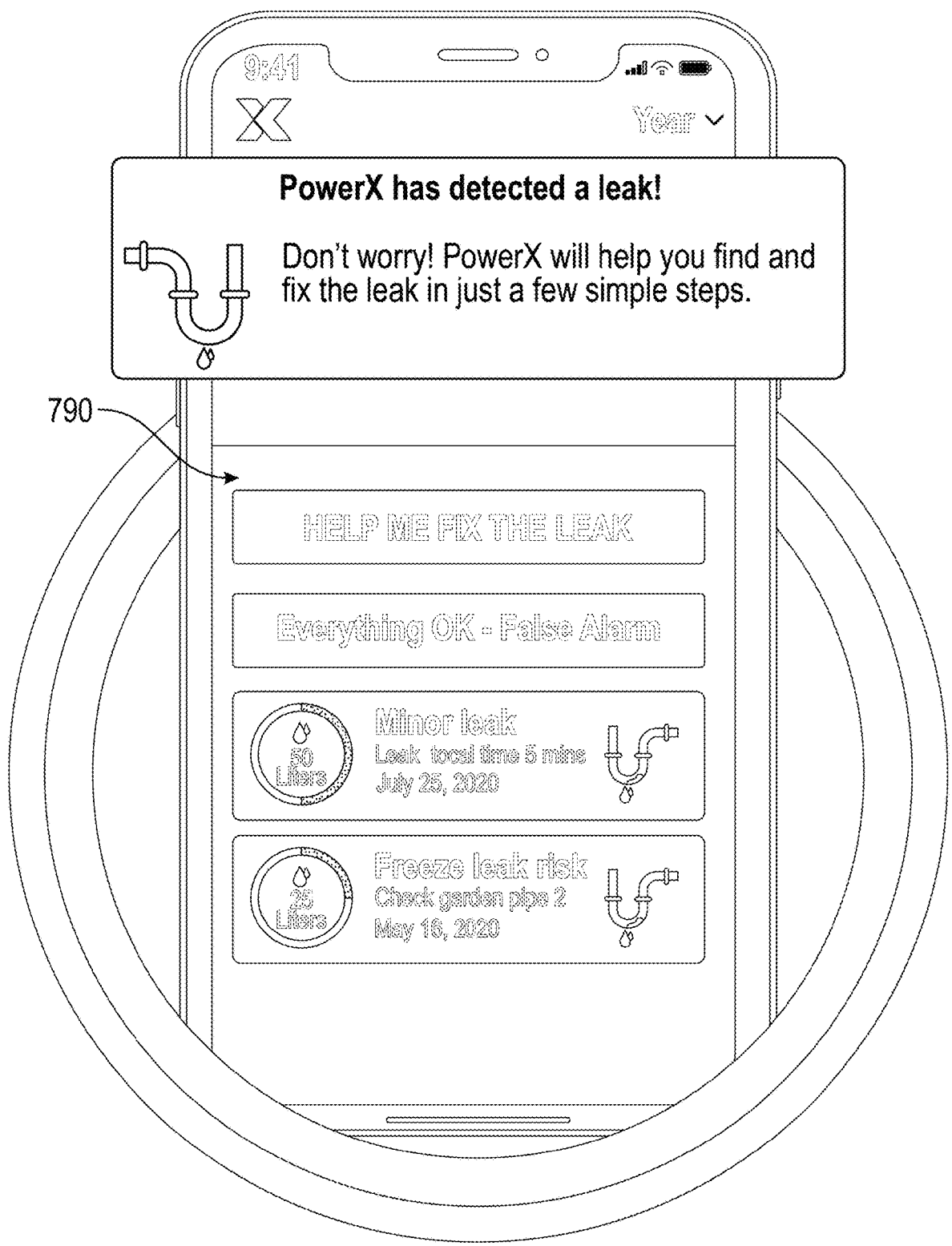
FIG. 7E illustrates an example user interface according to one embodiment of the present disclosure.

Referring now to FIG. 7E, a discussion of system 100 determined water leakage and user notification via an example user interface is described. FIG. 7E illustrates an example user interface 790 according to one embodiment of the present disclosure. The water sensor device 160 provides real-time leak detection and providing alerts for example through a mobile application. For example, the water sensor device 160 may monitor the flow of water, the system 100 receives the water usage information and may determine that that a leak is occurring. If a leak is determined to be occurring, then the system 100 may provide a notification or alert to the user via a user interface 790.

The user interface 790 may be generated by the user interface module 116 and in conjunction with the application engine 142 and be displayed as user interface 144. As discussed previously, the system 100 may determine leaks occurring in the water pipelines of a structure or household. The user interface 790 may be generated indicating that a leak has occurred, and the severity of the leak and the possible location of the leak. Usage information may be calculated by the data processing module 112.

The system 100 may determine the occurrence of a water leak by measuring the rate of flow of water per hour (such as liters/hour or gallon/hour). For example, at certain time periods of the day, such as late at night or early in the morning, use of water at a household typically would be zero. The system 100 may evaluate water flow at certain time periods, and if water flow is detected, then a leak may be determined to exist.

In further detail to determine the occurrence of a water leak, first the system 100 may increase precision of leak detection or determination by using noise reduction through machine learning processing to be able to identify very small leak flows such as 0.5 liter/hour. For example, the usual data from normal or common water flow usage is rather noisy. Every second the signal may jump up or down, centering around 0 (if there is no water flowing), so it may look like −29, +13, −2, +5. The data follows a sinus wave noise form around 0. The machine learning processing module 100 may uses a smoothing algorithm to remove this noise making it more precise.

Second, the system 100 evaluates for a flow-signature. The system 100 may calculate out existing devices (e.g. when shower, pool, faucet, washing machine, etc.) are all accounted for and there is then still a signature that has small standard deviation and small flow, and there is no outlet signature that fits to it we expect a leak (e.g. there is no real outlet that has a signature of 0.5 1/hour, constant flow, day and night, slightly increasing over time, also running when users are out for vacation as indicated by the electricity sensor device 170).

Third, the system 100 may couple the information received from temperature sensors connected to the water sensor device 160. The temperature sensors of water sensor device 160 may indicate whether there is any change in temperature between the inflow and backflow pipe. If there is not, the water likely gets lost somewhere in between.

Fourth, the system 100 evaluates other sensors and determines the sensor data being received by those sensors. For example, if the water heater sensor device 180 has a continuous small inflow of cold water over time and the heat goes down slightly more quickly than is expected by the system 100, the system 100 may determine that there is a suspected leak in the warm water pipe section. On the other hand, if the water heater sensor device 180 does not show any changes, the system 100 determine there is a suspected leak in the cold water pipe section. If the leak appears right after a certain device was shown to run (by the electricity sensor device 170 or the water sensor device 160), the system may determine a suspected leak is correlated with the pipe that serves this device. For example, if a washing machine was running and after that, the system 100 determines a continuous outflow of water of 0.5 1/hour or more an alert or message may be generated, and the user may be informed by the system of the occurrence of a suspected leak. In configuration and setup, the mobile application may receive input where the user may set up how precise the user wants us to measure leaks. The more precise the system measures for leaks, then the more leaks may be identified when there actually may be none. If the system 100 only look for medium or large leaks, then the system 100 may have a higher accuracy for identifying actual leaks.

Machine Learning and Obtained Sensor Data Evaluation

The system 100 and the machine learning processing module 110 may use several different combinations of artificial intelligence, machine learning, and/or deep learning processing as to the sensor data obtained from the sensor devices 160, 170, 180. These include, for example, 1-dimensional Convolution Neural Network (CNN), 2-dimensional Convolution Neural Network, 3-dimensional Convolution Neural Network, Recurrent Neural Networks, and Deep Temporal Clustering. The system 100 may train various machine learning models using the machine learning training module 108. To train the machine learning models, the system 100 may use actual or simulated utility usage data. The machine learning models and associated training data may be stored in a data storage repository, such as the database for the machine learning model data 124.

The following examples illustrate various machine learning processing that may be performed by the system 100 to classify and/or determine a confidence level or probability that an appliance, device and/or water outlet is being used and/or that an activity is occurring or has occurred. The machine learning processing module 110 may determine particular types of water sources being used (e.g., showers, water faucets, toilets, dishwasher and washing machines, etc.). The machine learning processing module 110 may determine particular types of electrical appliances being used (e.g., dish washer, refrigerator, televisions, computers, washing machines, dyers, lighting, etc.) and/or water outlets (e.g., showers, sinks, pools, water irrigation systems, etc.).

Referring back to combinations of artificial intelligence, machine learning, and/or deep learning processing, the system 100 may use a 1-dimensional Convolution Neural Network to identify patterns over time. For example, the system 100 may determine that a shower shows a certain pattern where water flow first increases, then stays rather stable at a specific liter per hour water usage level, then the water usage level decreases, usually taking a certain time of 3-25 minutes. The system 100 may then determine and/or classify the water flow usage pattern as a being a shower.

The system 100 may use a 2-dimensional Convolution Neural Network to recognize patterns, for example, a signal spectrogram. The system 100 may use this CNN to identify patterns (e.g. showers from a certain spectrogram 2D image with water over time) or inputs from more than one source (e.g. showers use both heat and water over time). The system 100 may evaluate heat values on an X-axis, and water flow values on a Y-axis and then obtain a signal spectrogram which is specific to showers. The system 100 may then use the signal spectrogram to determine and/or classifying the utility usage pattern of an appliance or device to be that of a shower.

The system 100 may use 3-dimensional Convolution Neural Network to recognize patterns e.g. signal spectrogram. The system 100 may use this CNN to identify patterns and inputs from more than one source (e.g. washing machines use heat and water and electricity over time). The system 100 may evaluate heat values on an X-axis, water flow values on a Y-axis, and electricity values on a Z-axis. The system 100 may determine or draw this over time, and then obtain a signal spectrogram which is specific to washing machines. The system 100 may then use the signal spectrogram to determine and/or classifying the utility usage pattern of an appliance or device to be that of a washing machine.

The system 100 may use Recurrent Neural Networks (e.g. LSTM, gru.) to determine temporal dynamic behavior (and is similar to a 1-dimensional CNN). For example, with received sensor data from the electricity sensor device 170, the system 100 may observe a certain Amperage load pattern and classifies the utility usage pattern of an appliance or device to be that of a clothes dryer.

The system 100 may use Deep Temporal Clustering to obtain value from unsupervised learning of patterns in temporal sequences and to deal with overlapping of the simultaneously happening events (shower and faucet for example). The system 100 may obtain time series data from sensor devices 160, 170, 180. The system 100 would have time-based utility usage informative including features on different time scales and may disentangle the data manifolds by processing the time-based utility information in three stages. First, the system 100 may use CNN processing to reduce the data dimensionality and determine the main short-time-scale waveforms. Second the system 100, may use BI-LSTM to lower the data dimensionality even more and determine the temporal connections between different waveforms across all time scales. Last, the system 100 may determine non-parametric clustering of BI-LSTM latent representations. The system 100 may then compare determined pre-annotated clusters with the utility sensor data from the sensor devices 160, 170, 180.

To system 100 may learn and determine utility usage patterns, user usage patterns, and/or sensor device 160, 170, 180 specific patterns using short-term utility usage information in combination with long-term utility usage information. For example, the system 100 may combine some local level descriptors (e.g., the last couple of minutes of obtained sensor data) that model what is happening now and combine long-term descriptors that encode information about the overall performance (e.g., daily/weekly data) as well as the metadata (e.g., pipe type when available).

To make predictions more precise, the system 100 may use location-based, temporal and/or other archetypes to increase the predictability or determination of the usage of an appliance or device. For example, temporal archetypes may indicate activities or usage of appliances or devices based on when the activity or usage is occurring. For example, water sprinklers tend to operate in the early morning, showers tend to happen later in the morning, while cooking happens around noon. The system 100 may use the time or time range of the day that utility usage is occurring to weight the likelihood of a particular appliance(s) or device(s) being used.

Local archetypes may indicate activities or usage of appliances or devices based on the location of the household being monitored by the sensor devices 160, 170, 180. For example, households in colder climates, such as Alaska, may use their water heaters more often, whereas households in warmer climates, such as Texas, may use their air conditioners more on highest loads, etc. The system 100 may use a geographic location of a household to weight the likelihood that particular appliance(s) or device(s) are being used.

The system 100 may also use other archetypes to weight the likelihood that particular appliances(s) or devices are being used. For example, the system 100 may obtain information about the number of household occupants and/or the size of the household. Information can be used by the system 100, such as large household tend to have pipes of material x, larger capacity water heaters may be used (such as 60 gallon water heaters), more time is spent for the use of showers and the use of appliances where there is a greater number of household occupants.

In some instances, the system 100 may use a Shapelet approach (shapelet transform) to create a baseline for further improvement to the prediction or classification of particular appliances or devices being used.

The system 100 may also use reinforced learning with the machine learning models. For example, if the system 100 is not able to classify or determine a particular appliance or device being used, the system 100 may obtain user confirmation via the user 140 receiving input from the user interface 144. For example, the system 100 may not be able to determine high enough confidence/probability or is not able to classify a particular appliance or device based on the received sensor data from the one or more sensor device 160, 170, 180. To obtain confirmation of the household appliance or device, the system 100 may provide information to the user noting a probability that a particular appliance or device has been determined, and request user confirmation of the actual appliance or device that was being used. For example, the system 100 may identify the water flow (or electric flow) as (a) a washing machine having a 60% probability, (b) a dishwasher having a 30% probability or (c) something else having a 10% probability. The system 100 obtains the users confirmation of the actual application or device that was used. The system 100 then uses the user feedback to improve the predictability and/or classifications of the machine learning models.

Further, the system 100 may use other machine learning techniques and processing. For instance, the system 100 may use logistic regression to predict whether heating occurs. As an example, if the system 100 obtains temperature sensor data of cold temperature at t−1 and t and tank temperature at t−1 and t show certain values, the system 100 may use logistic regression processing to determine x % probability that the water heater is currently heating. This may be used for example gas water heaters without a circuitry that may report heater temperature messages, since the other water heaters reveal their heating status in the data.

The system 100 may also control the operations of water heaters. For example, to optimize the water heaters, the system 100 evaluates heating efficiency by temperature bracket and selects the highest efficiency temperature brackets (e.g. measure adjusted heating delta by heating bracket). The system 100 may use prediction models (e.g. Seasonal ARIMA) to predict heat usage over time and to predict when a user is out for vacation. The system 100 may use external data (e.g. electricity/gas prices) to heat the heater at the cheapest time. The system 100 may compare cycle times for their efficiency (e.g. heating in short staccato vs. in long periods). The system 100 may receive from a user interface 144 user input indicating dates and/or time durations when a user may be out of a household for an extended period of time, such as a vacation. The system 100 may use the dates and/or time periods of non-occupancy of the household, and may instruct, via the water heater sensor device 180, the water heater to turn off during the user provided time periods. The system 100 may also use the water heater for grid load balancing, following an electric signal to take electricity from the power grid at high loads and stopping water heaters at low grid load.

Moreover, the received sensor data from the sensor devices 160, 170, 180 may be combined together by the system 100 to determine utility usage and/or identify a type of appliance or device being used. Several household appliances use water, heat and electricity, and the received sensor data from the sensors 160, 170, 180 may be used by the system 100 to identify a particular appliance being used (such as a dish washer or a washing machine). For example, the use of a washing machine may be determined by the system 100. The system 100 may evaluate sensor information received from the water sensor device 160 indicating water flow from the water heater sensor device 180 and temperature data indicating a drop in tank temperature (and/or water flow of the cold water refill of the water heater tank). The system 100 may also evaluate sensor information from the electricity sensor device 180 indicating an amperage draw. The system 100 may determine the likelihood or probability that a washing machine is being used based on the combined information of the water flow and electricity being used at the same time or being used over a period of time.

Other household appliances may draw any combination of water and heat, water and electricity or heat and electricity. For example, the system 100 may determine the occurrence of the heating of water of an electric water heater by detecting an increase in temperature when the water is being heated. The system 100 may obtain from the water heater sensor device 180 temperature data. At the same time that the water is being heated the electricity sensor device 170, the system 100 may also obtain sensor data from the electricity sensor device 180 indicating that an electric current with power being drawn.

Furthermore, many household appliances or devices are clearly distinguishable by their specific utility usage characteristics from the system's 100 evaluation of combined sensor data obtained from two or three sensors devices 160, 170, 180. For instance, an electric water heater usually uses 16-22 Amps for 2-10 minutes. The system 100 may utilize this characteristic of the electric water heater to aid in distinguishing one appliance or device from another. The system 100 may determine the occurrence of a peak of 40 Amps from the evaluation of received data from the electricity sensor device 170. With just the electricity sensor data of 40 Amps there may be multiple different appliances or devices that could possibly be drawing this much power, and a particular appliance being used may not be determinable by the system 100. However, when the electricity sensor data and other sensor data from the water heater sensor device 180 is combined together, the system 100 may determine that a particular appliance likely being used. For example, if the water heater sensor device 180 indicates 10 minutes of heating at 20 Amps (and the electric water heater is known to use 20 Amps when heating), and at the same time the electricity sensor device 180 indicates 40 Amps of electricity usage, then there is an additional 20 Amps that is being used by some other appliance. The system 100 would attribute the known 20 amps of the 40 amps of the electricity usage to the electric water heater, but another 20 more amps needs to be accounted for by the system 100.

The system 100 may determine that a refrigerator has a standard, long-term load pattern with small standard deviation of 10 Amps and that the refrigerator was running before the electricity sensor device 180 measured the 40 Amps. The system 100 would then be able to account for 30 Amps of the 40 Amps (e.g., 20 Amps for the electric water heater and 10 Amps for the refrigerator, leaving 10 more Amps to be accounted for). However, the system 100 does not obtain sensor information about any water flow from the water sensor device 160 or any outflow of water heater sensor device 180 at the time of the 40 Amp spike. Knowing that these sensor devices 160, 180 are not showing utilization information, the system can rule out that application or device is not a washing machine, a shower, faucet, pool or anything else that draws water or heat at the same time as it uses electricity.

However, they system 100 may identify a characteristic spike to 42 Amps of 2 milli seconds just short before the drop to 40 Amps and then identify an unstable electricity usage pattern with high standard deviation. The system 100 may determine that the signature of the initial spike and following unstable electricity usage pattern usually correlates with a coffee machine or tea boiler. The system 100 may have also measured water flow worth about 0.5 liters 1 minute before the measurement of the 40 Amps. In this scenario, the system 100 may determine at a 70% probability that a user was filling up the coffee machine 1 minute before and is now using the coffee machine which likely accounts for the missing 10 amps. The system 100 would then determine that a coffee machine was using the last 10 amps.

As the system 100 may only have a 70% probability or confidence that a coffee machine as being used, the system 100 may initiate a transmission to a user device and the user interface 144 may display information indicating that, a new device has been identified and there is 70% probability the device is a coffee maker, there is a 20% probability that the device is a tea kettle, there is a 10% probability that the device is something else. Via the user interface 144, the user may input feedback indicating and/or confirming what the device, actually was. The received input may then be provided as feedback into the machine learning models to aid in better prediction or determination of an application or device. The system may identify unusual usage patterns from sensor data from the various sensor devices 160, 170, 180, and prompt a user via the user interface 144 to identify what the actual appliance, device or water outlet was. The system 100 may then store this information, and when the system identifies the usage pattern to have occurred again, the system 100 may assign or attribute the usage pattern to an appliance, device and/or water outlet that was previously specified by the user.

The system 100 may determine which appliances, devices or household systems are being used based on the received sensor data from the various sensors 160, 170, 180. In one example, the water heater sensor device 180 may obtain tank temperature, cold pipe temperature, optionally warm pipe temperature, heating pattern and time to predict the appliance. The system 100 may determine that if cold water flows back for a period of time (such as 10 minutes) and there is a temperature drop in the water heating tank (such as 5° Celsius), the system 100 may determine that a shower is likely being used. The system 100 may determine if there is a temperature drop (such as of 10° C.) every morning at a particular time of the day (such as 5 am) over several days, then the system 100 may determine that a pump system that pumps 10° C. into the piping at a pre-defined time is likely being used.

In another example, the system 100 may obtain electricity usage data using the electricity sensor device 180 to determine that different types of appliances are being used. The system 100 may use electric signatures to determine that different appliances are being used. For example, the system 100 may determine an initial spike in electricity usage when a machine is turned on, the standard deviation of the machine, the length the machine is running, the amperage the machine consumes, etc. The system 100 may evaluate the received sensor data and feed the senor data into and evaluate them with any one of the 1D CNN, RNN, 2D CNN, 3D CNN and deep temporal clustering as previously described. In many instances, a determined usage signature is more intricate then just a spike and following standard deviation as it is picked up by the machine learning models.

Water Heater Optimization and Control

The machine learning processing module 110 may determine inefficient appliances by evaluating utility usage patterns and suggest savings potential by recommendation usage behavioral changes (such as changing usage to another time of day). The machine learning processing module 110 may determine more efficient heat ranges and cycle times, and the water heater sensor device 180 may control and shut off the heating of water heaters during scheduled time periods or for detected time periods of inactivity (such as determining that other appliances or electricity is not being used, and the system 100 may determine that a household may not be occupied). Additionally, the machine learning models and processing performed by the system 100 may be used to calculate energy loss, for example, from inefficient heating cycles or standby heating while there is no hot water consumption.

For example, with regard to FIG. 4A, the machine learning module 110 may correct for the temperature difference of the water body compared to the temperature measured by temperature sensor 405. Machine learning processing module 110 may be used to calculate energy loss, e.g. from inefficient heating cycles or standby heating while there is no hot water consumption. The system 100 may send an optimized heating pattern to the water heater sensor device 180-A. This optimized heating pattern may be transferred to the gas valve controller 440 through the Controller Signal Connector 455.

For example, with regard to FIG. 4B, the system 100 may transmit an optimized heating pattern to the water heater sensor device 180. This optimized heating pattern may be implemented by the water heater sensor device 180 by means of an internal relay controlling electric supply 465. The Electric Heater Controller may then regulate the heating element 470 and hence control the water temperature in the tank 421. Machine learning processing module 110 may be also be used to correct for the temperature difference of the water body compared to the temperature measured by temperature sensors. For example, the external temperature sensors may read temperatures to be several degrees (e.g. 10° C.) lower than an actual temperature in the tank. Also, drops and increases in water temperature may not be as pronounced (captured as sensitively) as in reality or only captured with a time lag. They system 100 may use trained machine learning algorithms to pick up the temperature difference of external based temp measurement and real water temperature and to apply an adjustment algorithm to calculate out lags, wrong amplitudes of temperature increase/decrease or time lags.

Grid Load Balancing the Grid

Figure 9:
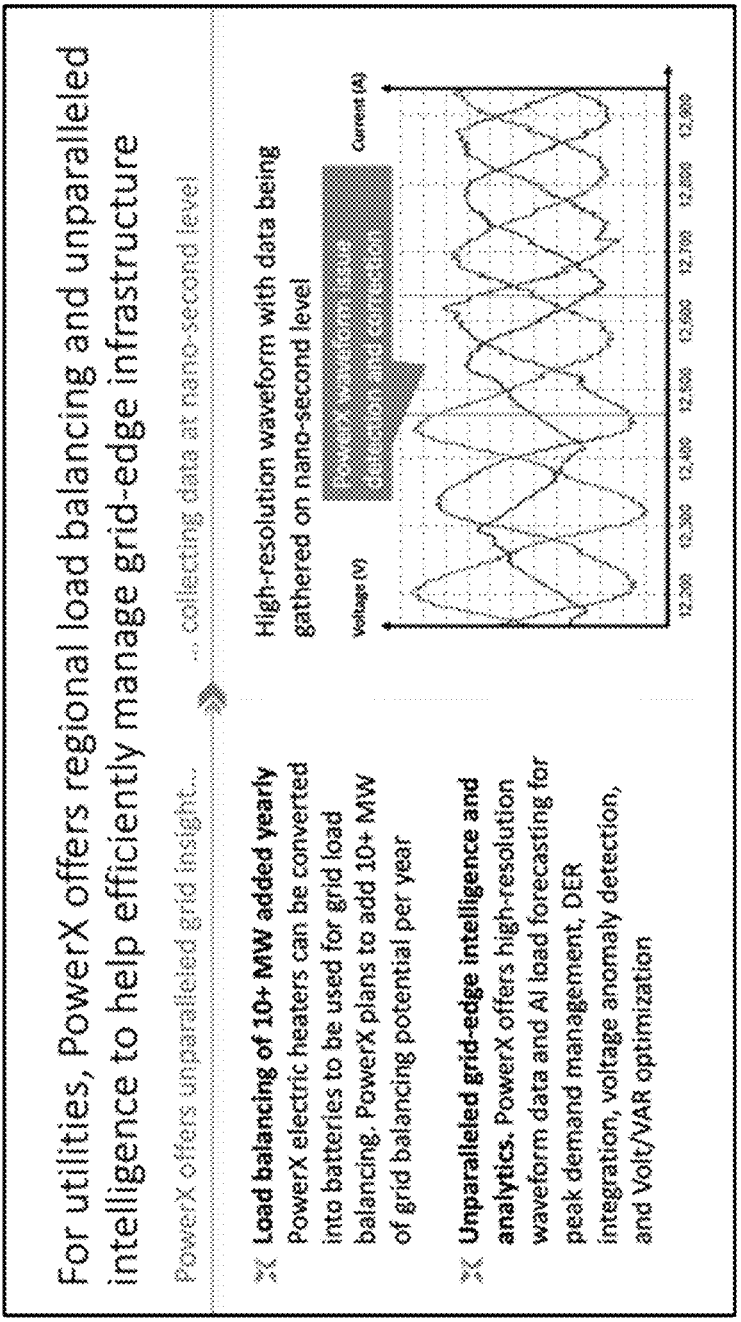
FIG. 9 illustrates an example chart show grid load balancing.

The electricity information obtained by the system 100 may use used for grid load balancing. The information gathered by electricity sensor devices 170 can be of great use to utility companies. The information may include analytics that helps with load forecasting, peak demand management, DER integration, voltage anomaly detection, and Volt/VAR optimization. Generally, it helps to efficiently manage grid-edge infrastructure. Furthermore, the water heaters can be used for load balancing the grid as depicted in the FIG. 9

Example Computer System

Figure 8:
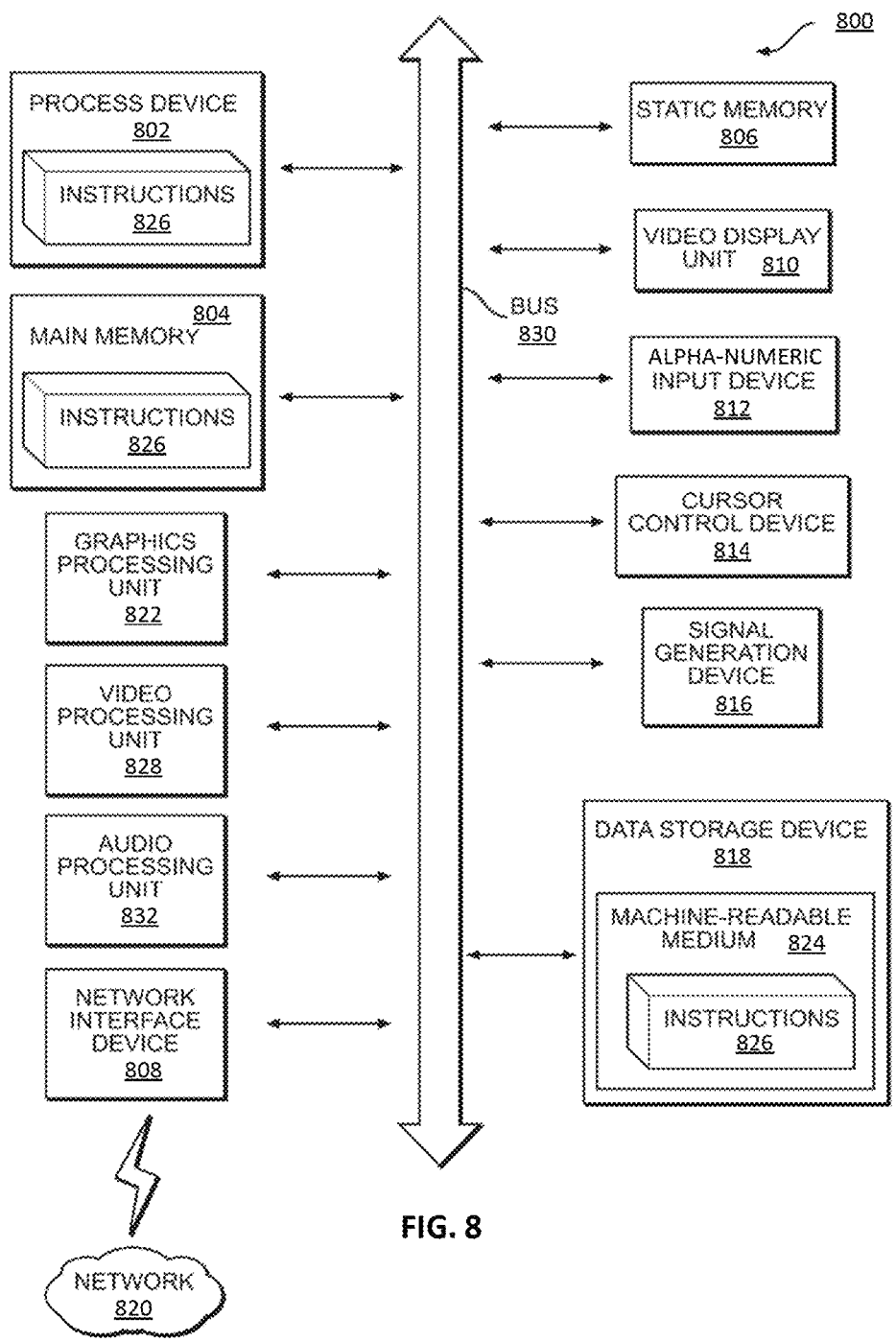
FIG. 8 illustrates a diagram of an exemplary environment in which some embodiments may operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

Additional User Interfaces

Figure 10A:
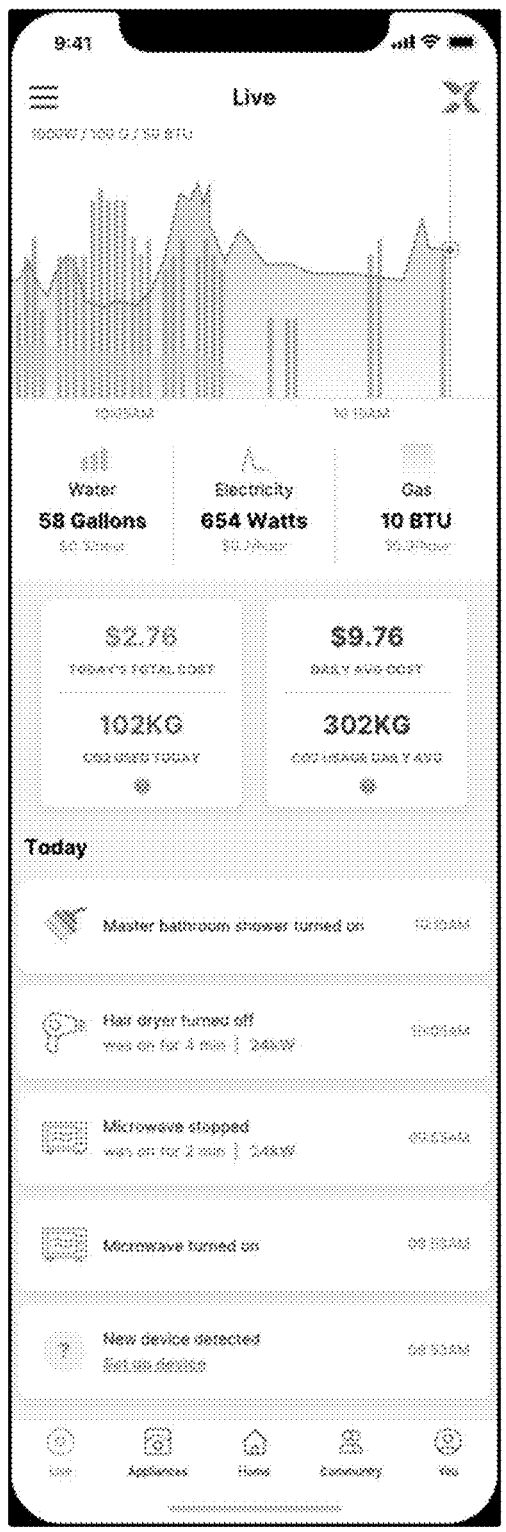
FIG. 10A illustrates example user interfaces according to one embodiment of the present disclosure.

FIG. 10A illustrates example user interfaces according to one embodiment of the present disclosure. The example user interface of FIG. 10A may be generated by the system 100 and may be displayed on a display of a mobile computing device. The system 100 may determine real-time utility usage information (e.g., water, electricity and gas). For example, the interface shows a real-time or live graph of water, electricity and gas usage and associated costs for the utility usage. The system 100 may determine the starting and stopping of different devices (e.g., master bathroom shower, hair dyer, microwave, etc.).

Figure 10B:
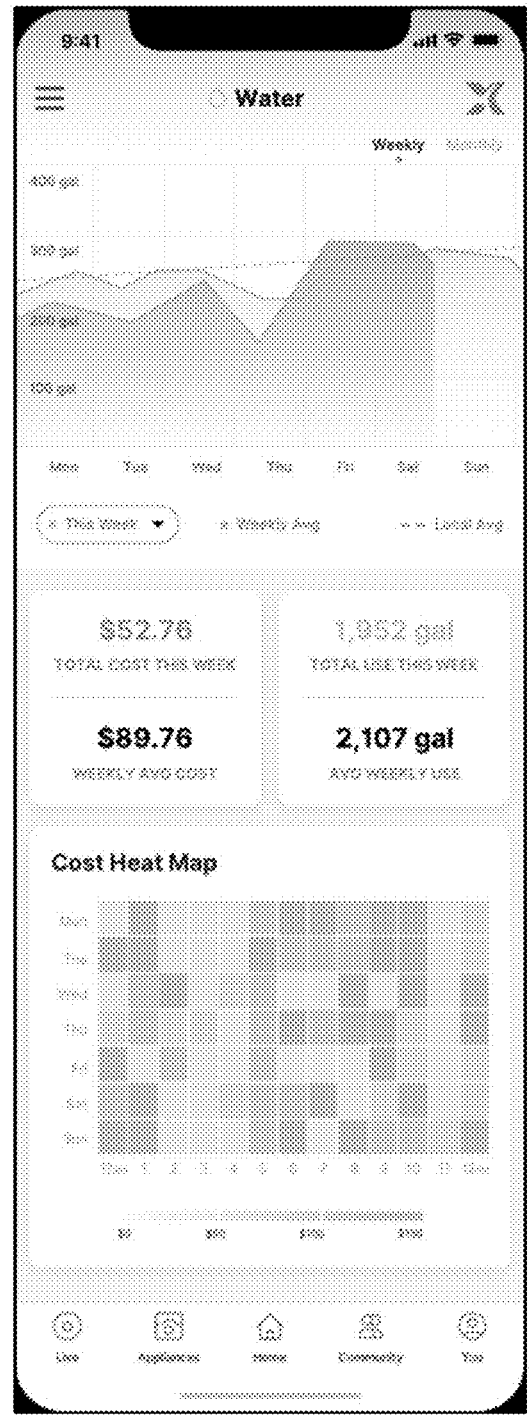
FIG. 10B illustrates example user interfaces according to one embodiment of the present disclosure.

FIG. 10B illustrates example user interfaces according to one embodiment of the present disclosure. The example user interface of FIG. 10B may be generated by the system 100 and may be displayed on a display of a mobile computing device. The system 100 may determine water utility usage information on a weekly or monthly basis. For example, the interface shows a weekly graph of water usage, and associated costs for the water usage. The system 100 may determine and display a cost heat map for the time and days of the week and a corresponding value for a particular time period.

Figure 10C:
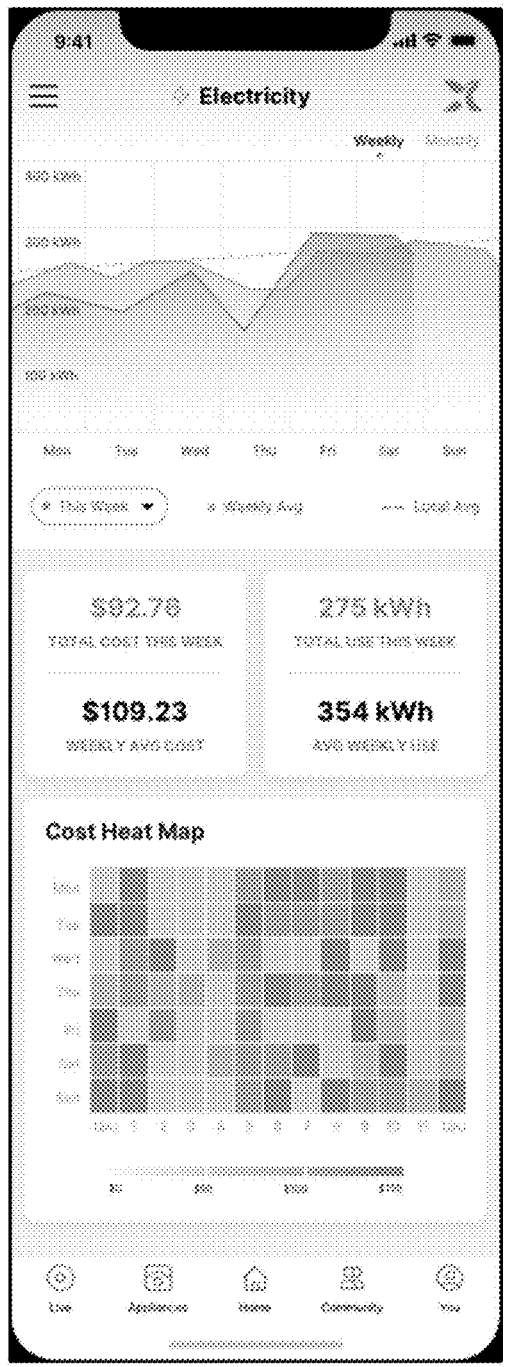
FIG. 10C illustrates example user interfaces according to one embodiment of the present disclosure.

FIG. 10C illustrates example user interfaces according to one embodiment of the present disclosure. The example user interface of FIG. 10C may be generated by the system 100 and may be displayed on a display of a mobile computing device. The system 100 may determine electricity utility usage information on a weekly or monthly basis. For example, the interface shows a weekly graph of electricity usage, and associated costs for the electricity usage. The system 100 may determine and display a cost heat map for the time and days of the week and a corresponding value for a particular time period.

Figure 10D:
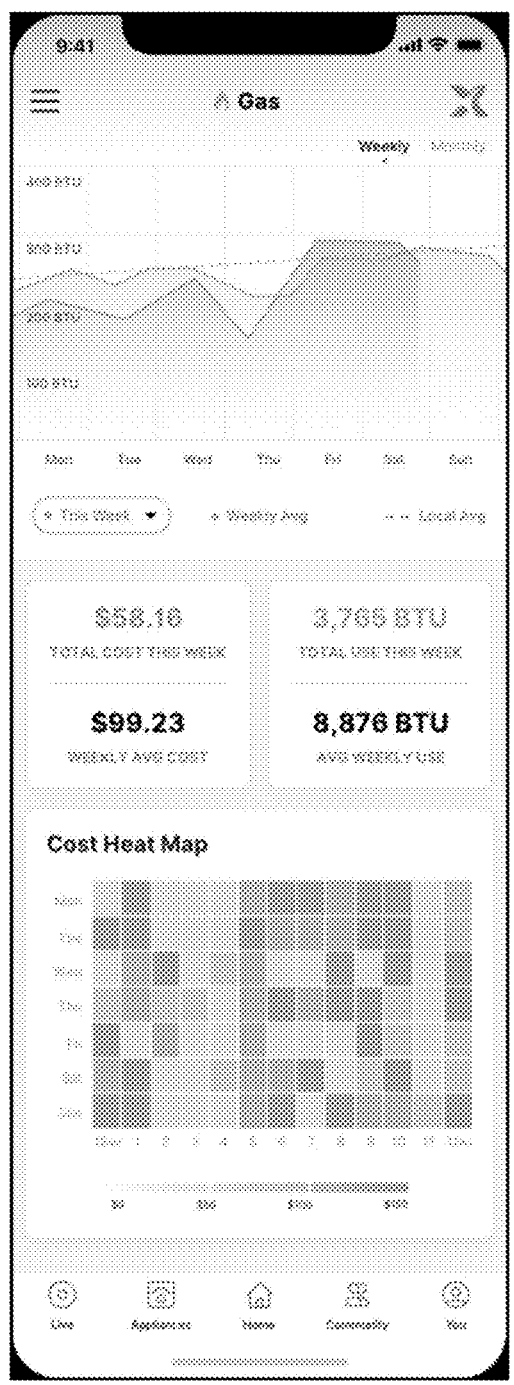
FIG. 10D illustrates an example user interface according to one embodiment of the present disclosure.

FIG. 10D illustrates an example user interface according to one embodiment of the present disclosure. The example user interface of FIG. 10C may be generated by the system

100 and may be displayed on a display of a mobile computing device. The system 100 may determine gas utility usage information on a weekly or monthly basis. For example, the interface shows a weekly graph of gas usage, and associated costs for the gas usage. The system 100 may determine and display a cost heat map for the time and days of the week and a corresponding value for a particular time period.

Figure 11A:
FIG. 11A illustrates an example user interface according to one embodiment of the present disclosure.

FIG. 11A illustrates an example user interface according to one embodiment of the present disclosure. The example user interface of FIG. 11A may be generated by the system 100 and may be displayed on a display of a mobile computing device. The system 100 may determine weekly utility usage. The system 100 may generate a user interface depicting a graph of the type of utility being used (e.g., daily usage). The system 100 may calculate a total and weekly average cost of utility being consumed (e.g., total cost this week of $12.76 and a weekly average cost of $19.76). The system 100 may determine those devices that are always and/or constantly being used and determine a cost of usage for those categories of devices. The system may determine a total weekly cost for respective utility types (e.g., water, gas and/or electricity). For a particular utility type, the system may determine the type of device usage type (e.g., master shower, guest bathroom, washing machine, etc.). The system 100 may determine and display a graph and a percentage of the top usage of devices as compared to the total of the other used devices.

Figure 11B:
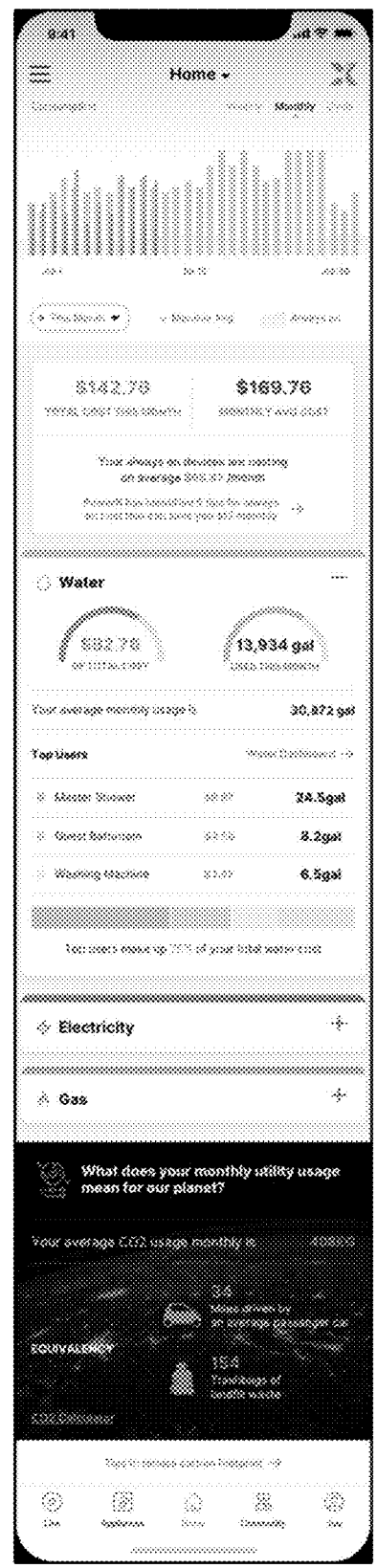
FIG. 11B illustrates example user interfaces according to one embodiment of the present disclosure.

FIG. 11B illustrates example user interfaces according to one embodiment of the present disclosure. The example user interface of FIG. 11B may be generated by the system 100 and may be displayed on a display of a mobile computing device. The system 100 may determine monthly utility usage. The system 100 may generate a user interface depicting a graph of the type of utility being used (e.g., daily usage). The system 100 may calculate a total monthly cost and an average monthly cost of utility being consumed (e.g., total cost this month of $142.76 and a monthly average cost of $169.76). The system 100 may determine those devices that are always and/or constantly being used and determine a cost of usage for those categories of devices. The system may determine a total monthly cost for respective utility types (e.g., water, gas and/or electricity). For a particular utility type, the system may determine the type of device usage type (e.g., master shower, guest bathroom, washing machine, etc.). The system 100 may determine and display a graph and a percentage of the top usage of devices as compared to the total of the other used devices.

Figure 12:
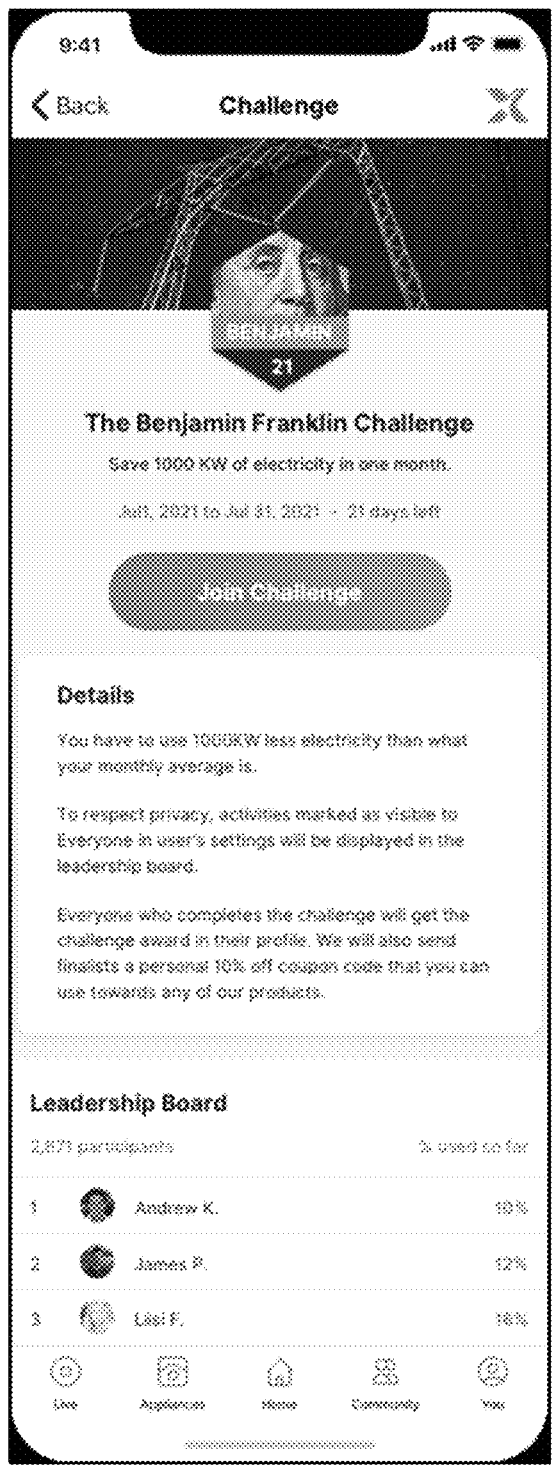
FIG. 12 illustrates example user interfaces according to one embodiment of the present disclosure.

FIG. 12 illustrates example user interfaces according to one embodiment of the present disclosure. The example user interface of FIG. 12 may be generated by the system 100 and may be displayed on a display of a mobile computing device. The user interface allows users of the system to join a challenge to change their usage patterns for utilities. For example, the system may allow users to join the challenge and track the usage behaviors of the users of different types of utilities. A leader board may display the users and list the percentage utility used by a particular user.

Figure 13A:
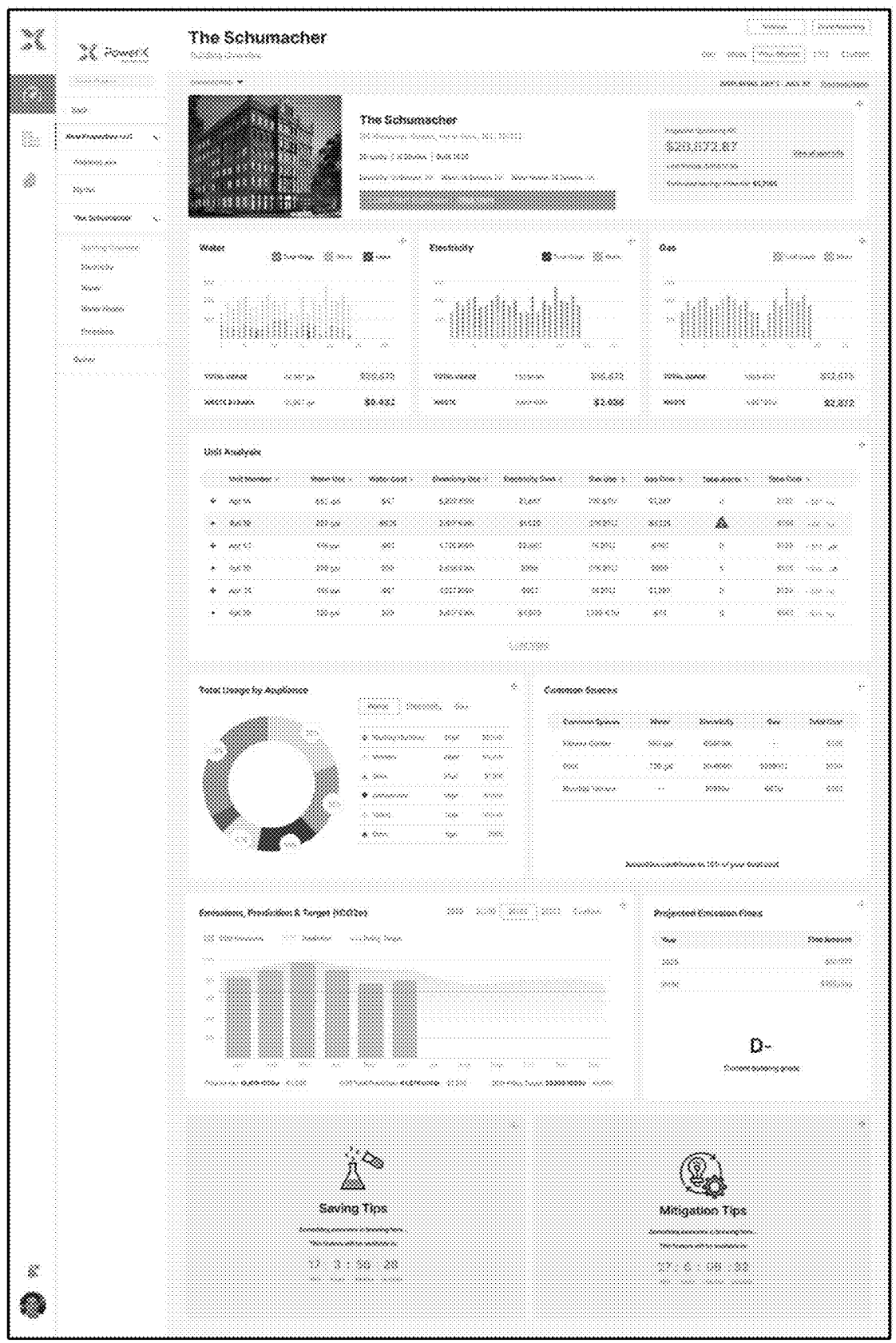
FIG. 13A illustrates example user interfaces according to one embodiment of the present disclosure.

FIG. 13A illustrates example user interfaces according to one embodiment of the present disclosure. The example user interface of FIG. 13A may be generated by the system 100 and may be displayed on a display of a computing device. FIG. 13A depicts a building overview for various units of a building. For example, the user interface may list respective unit (e.g., Apt 1A, Apt 1B, etc.) and their respective utility usage and cost information (e.g., for water, electricity and gas). The system may obtain data related to the respective units and then determine a total usage information for the building. For example, the system may determine total water, electricity and gas usage. The system 100 may also determine waste and leak information. The user interface may also display the status of the sensors of the building (e.g., electricity: 20 sensors ok, water: 14 sensors ok, water heater: 14 sensors ok). This user interface allows a building manager to identify overall utility usage and potential waste scenarios, and those individual units that are overusing certain utilities. The system 100 may also determine common devices (e.g., washing machines, showers, sinks, dishwashers, toilets, other, etc.) and display a graph showing the percentage usage of the category of the device as to other devices. The graph and devices may be determined separately for water, electricity and gas. Moreover, the system may determine common spaces of the building and the utility usage for those common spaces (the common spaces being separate from the units). Additionally, the system may determine and display a graph for emissions, prediction and targeting for the building. A grade or score may be calculated and be displayed by the system as to how the building is performing with respect to emotions.

Figure 13B:
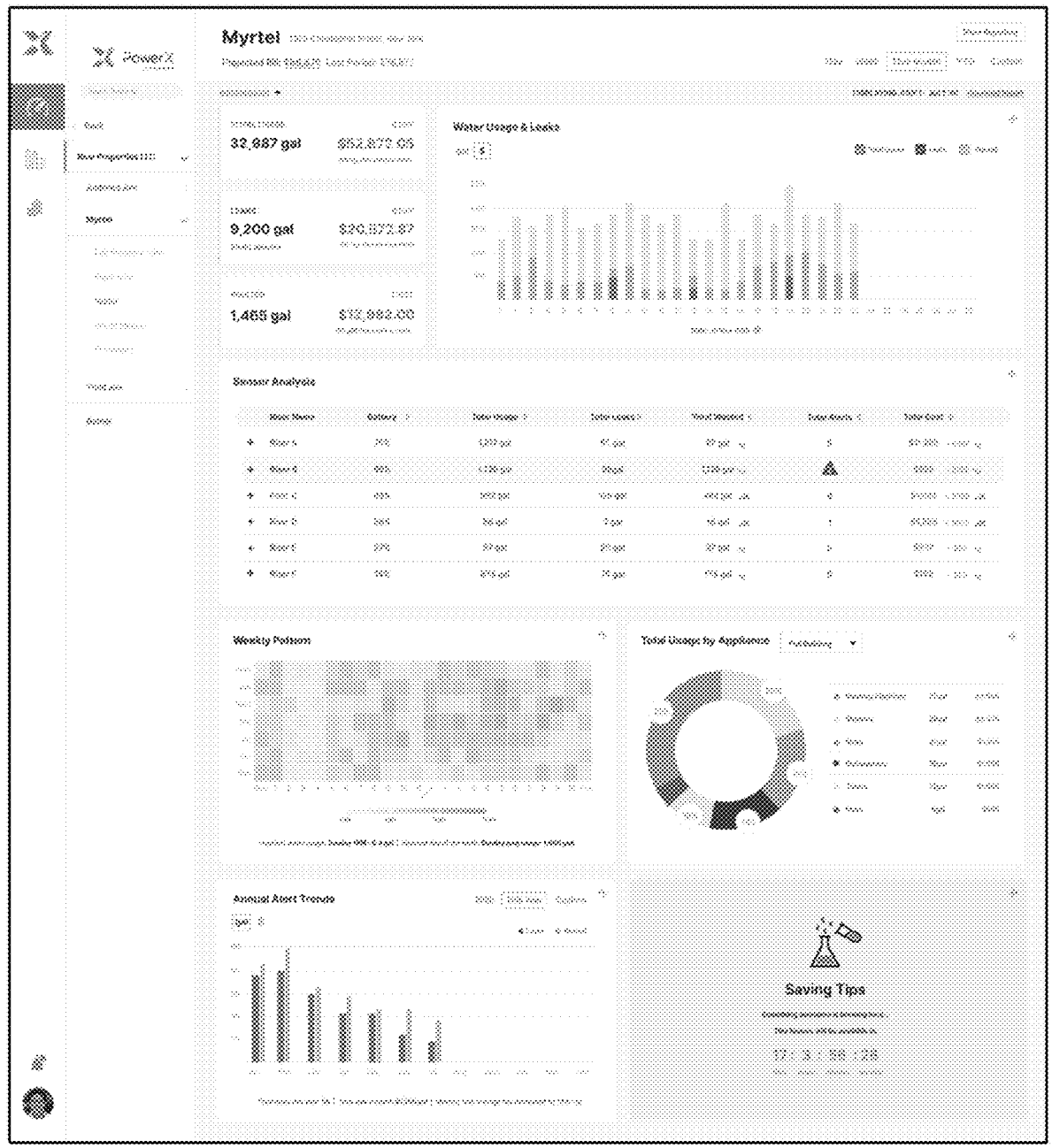
FIG. 13B illustrates example user interfaces according to one embodiment of the present disclosure.

FIG. 13B illustrates example user interfaces according to one embodiment of the present disclosure. The example user interface of FIG. 13B may be generated by the system 100 and may be displayed on a display of a computing device. FIG. 13B depicts a building overview for various units of a building of water usage for the units of the building. For example, the user interface may list respective unit (e.g., Apt 1A, Apt 1B, etc.) and their respective utility usage and cost information (e.g., for water, electricity and gas). In this example, the water usage information on a monthly basis is depicted. A user may select to review electricity, water, water heater and emission usage. The usage information may be displayed on for a particular time period (e.g., daily, weekly, monthly, yearly or a custom time period). The user interface may include a display portion depicting a heat map of a weekly pattern of utility usage by the units). The user interface may include a display portion depicting a total usage by appliance for the utility type (in the example user interface being water usage) for the aggregate units. In other words, the system may evaluate received data for multiple sensor of the same type (such as a water sensor) for multiple locations, units or buildings. For example, the total water usage by appliance (e.g., washing machines, showers, sinks, dishwashers, toilets, etc.) may be displayed via a graph with the respective percentage of usage of the appliance being displayed.

Figure 13C:
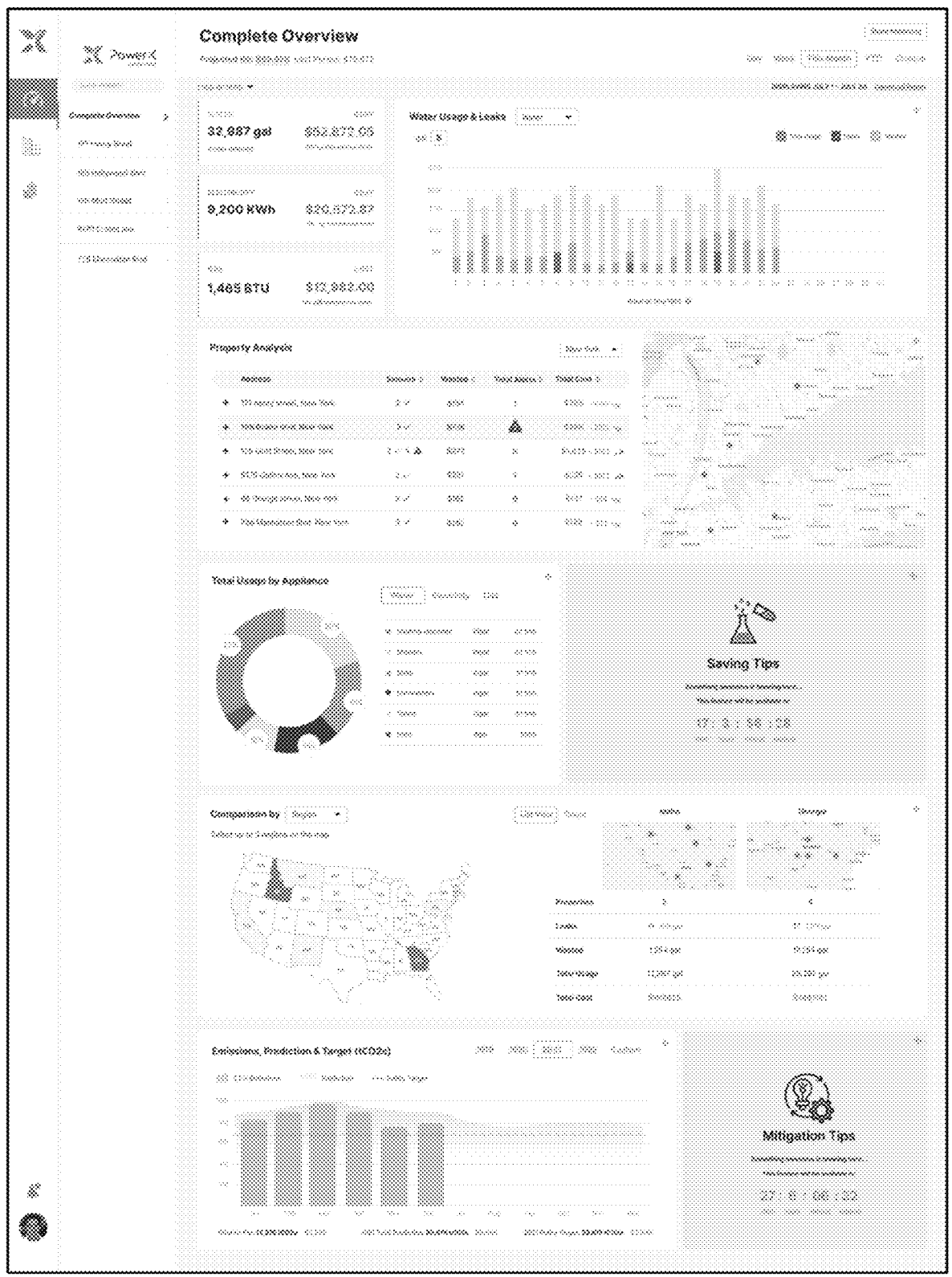
FIG. 13C illustrates example user interfaces according to one embodiment of the present disclosure.

FIG. 13C illustrates example user interfaces according to one embodiment of the present disclosure. The example user interface of FIG. 13C may be generated by the system 100 and may be displayed on a display of a computing device. FIG. 13C depicts a complete overview for various buildings of water usage for the buildings. In this view, the system determines utility usage information for a number of buildings (e.g., 171 Henry Street, 165 Hollywood Bvd, 176 Mott Street, etc.). This view allows a manager to evaluate usage information for multiple buildings. The user interface may display a listing of the different buildings with the buildings respective address. The listing may include the total number of sensors at the building (in this example, water sensors are counted). The system may display an alert of a graphical icon indicating an issue or problem with one of the sensors. For example, the one of the water sensors at 176 Mott Street is displayed with an alert. The user interface may include a display portion depicting a total usage by appliance for the utility type (in the example user interface being water usage)

for the aggregate buildings. For example, the total water usage by appliance (e.g., washing machines, showers, sinks, dishwashers, toilets, etc.) may be displayed via a graph with the respective percentage of usage of the appliance being displayed. The user interface may also provide functionality for comparing buildings in different regions (e.g., comparing multiple states such as Idaho and Georgia). The user interface may receive a selection from a user for the regions to be compared.

Figure 13D:
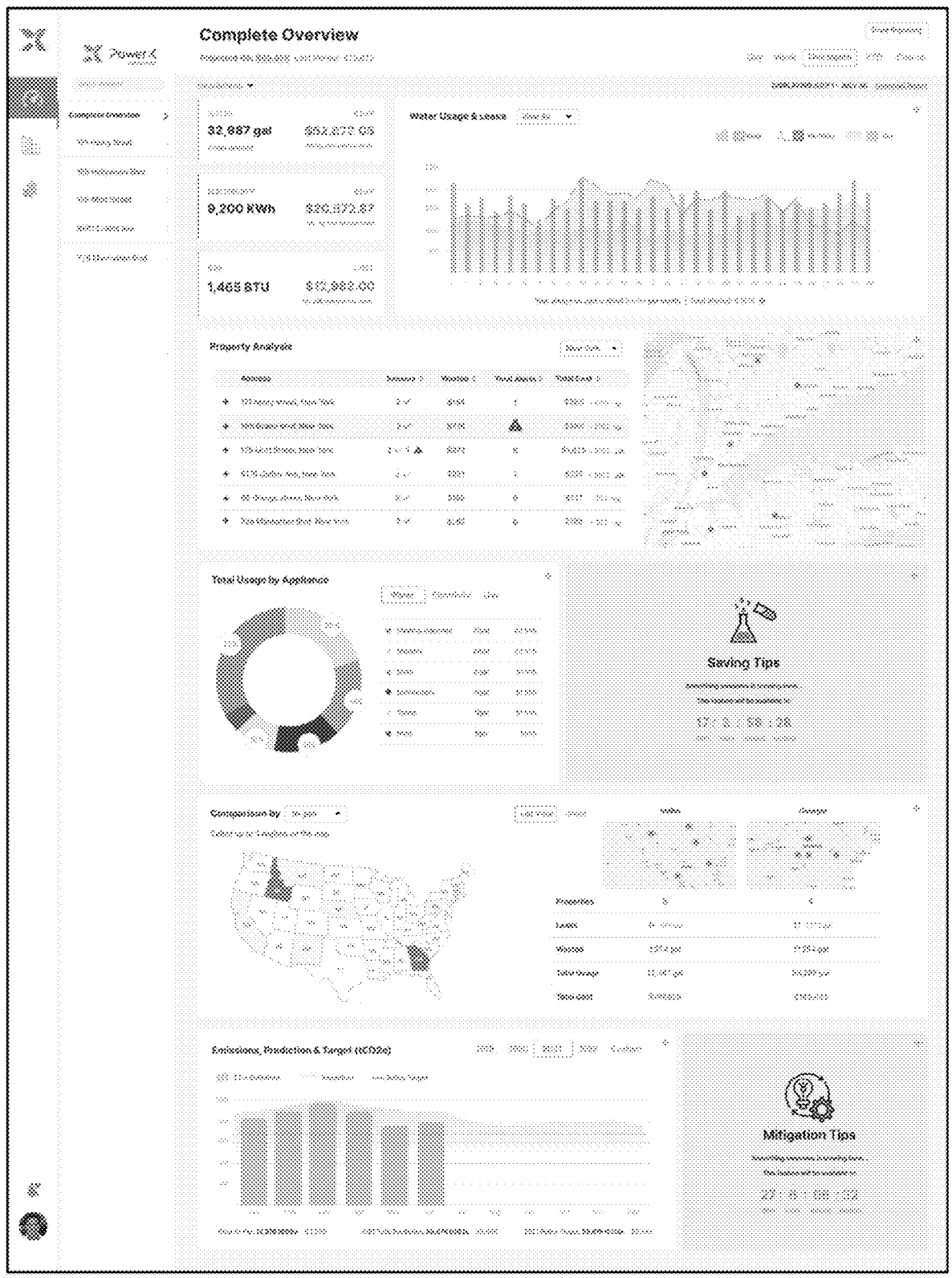
FIG. 13D illustrates an example user interface according to one embodiment of the present disclosure.

FIG. 13D illustrates an example user interface according to one embodiment of the present disclosure. The example user interface of FIG. 13D may be generated by the system 100 and may be displayed on a display of a computing device. FIG. 13D depicts a similar view of FIG. 13C. In this view, the system determines utility usage information for a number of buildings (e.g., 171 Henry Street, 165 Hollywood Bvd, 176 Mott Street, etc.). A graph may be displayed of all utility information (e.g., water, electricity and gas) over a time period for all of the buildings or properties and/or a selection of a subset of the buildings or properties.

Figure 13E:
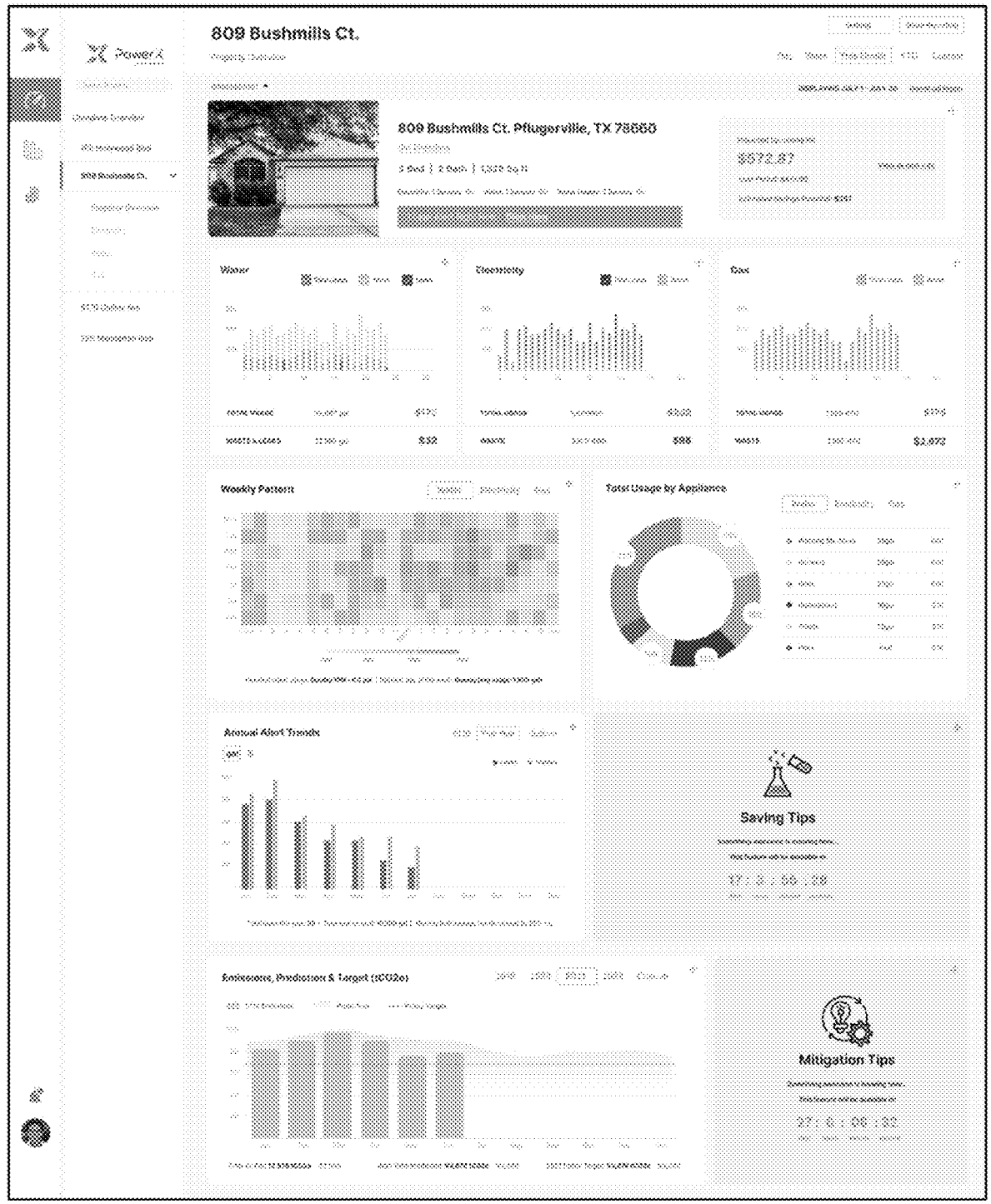
FIG. 13E illustrates an example user interface according to one embodiment of the present disclosure.

FIG. 13E illustrates an example user interface according to one embodiment of the present disclosure. The example user interface of FIG. 13E may be generated by the system 100 and may be displayed on a display of a computing device. The system 100 may determine utility usage patterns for a residence. The system 100 may generate a user interface depicting a graph of the type of utility being used (e.g., daily, weekly, monthly, annually)). The system 100 may calculate a total and average cost of utility being consumed for the time period. The system 100 may also determine common devices (e.g., washing machines, showers, sinks, dishwashers, toilets, other, etc.) and display a graph showing the percentage usage of the category of the device as to other devices. The graph and devices may be determined separately for water, electricity and gas. The user interface may include a display portion depicting a heat map of a periodic pattern (e.g., daily, weekly, monthly, yearly) of utility usage (e.g., water, electricity, gas) for the particular residence.

The system 100 may determine those devices that are always and/or constantly being used and determine a cost of usage for those categories of devices. The system may determine a total weekly cost for respective utility types (e.g., water, gas and/or electricity). For a particular utility type, the system may determine the type of device usage type (e.g., master shower, guest bathroom, washing machine, etc.). The system 100 may determine and display a graph and a percentage of the top usage of devices as compared to the total of the other used devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A system comprising one or more processors, and a non-transitory computer-readable medium including one or more sequences of instructions that, when executed by the one or more processors, cause the system to perform operations comprising:
    training a machine learning network to identify an appliance being used based on utility usage information of the appliance;

receiving water usage information from a first sensor device having a first sensor device processor, wherein the first sensor device is configured to sample at a predetermined rate and receive signals for water flow rate information from ultrasonic sensors coupled to a water pipe, and is configured to communicate via a long range wireless protocol (LoRa) via a first sensor device LoRa chip, wherein the first sensor device processor samples the signals and provides the signals to the first sensor device LoRa chip;

transmitting, from the first sensor device, the received water usage information to a LoRa radio of a hub device;

receiving electricity usage information from a second sensor device having second sensor device processor, wherein the second sensor device is configured to receive amperage information from clamp meters attached to electrical wiring, is configured to receive voltage information from a connection to a circuit of an electrical panel, and is configured to communicate via the LoRa protocol via a second sensor device LoRa chip, wherein the second sensor device processor samples the amperage information and provides the amperage information to the second sensor device LoRa chip;

transmitting, from the second sensor device, the received electricity usage information to the LoRa radio of the hub device;

receiving water heater usage information from a third sensor device having a third sensor device processor, wherein the third sensor device is configured to receive temperature information from temperature sensors positioned about a water heater and/or from a controller of the water heater, and is configured to communicate via the LoRa protocol via a third sensor device LoRa chip, wherein the third device processor samples the temperature information and provides the temperature information to the third sensor device LoRa chip;

transmitting, from the third sensor device, the received water usage information to the LoRa radio of the hub device, wherein the hub device is configured to send a wake up instruction to any of the first sensor device, the second sensor device and the third sensor device;

based on the received water usage information, and/or the received water heater usage information, and the received electricity usage information, identifying by the trained machine learning network, one or more appliances likely having been used, wherein the one or more appliances uses both electricity sourced from the circuit and water sourced from the water pipe;

presenting, via a user interface, two or more appliances that may have been used;

receiving, via the user interface, a user confirmation of an actual appliance of the two or more appliances that may have been used;

using the received user confirmation to improve the machine learning network predictability of the one or more appliances likely having been used;

determining utility usage information for the one or more appliances; and displaying, via a user interface, a graphical indication of the determined utility usage information for the one or more appliances being used, the user interface comprising a portion of the user interface graphically depicting utility information for the one or more appliances.

2. The system of claim 1, further comprising the operations of:

based on the received water usage information, the received electricity usage information and/or the received water heater usage information, determining aggregate usage information for a time period for electricity usage, water usage and gas usage; and displaying, via the user interface, the determined aggregate usage information.

3. The system of claim 1, further comprising the operations of:

determining times for operation of the water heater; and controlling operation of a water heater based on the determined times.

4. The system of any claim 1, further comprising the operations of:

determining the occurrence of a water leak of a particular appliance based on the received water usage information; and presenting, via a user interface, an indication of the water leak, and a possible location of the water leak.

5. The system of claim 1, further comprising the operations of:

transmitting from the first, second and third sensor device to a hub device; and transmitting from the hub device to a service to receive the water usage information, the electricity information and the water heater usage information.

6. The system of claim 1, further comprising the operations of:

determining the likely appliance being used based on evaluation of sensor data obtained from one or more of the first, second or third sensor device;

receiving a user input via a user interface confirming what type of appliance has been used; and based on the received user input retraining a machine learning model to improve the determination of the likely appliance being used.

7. The system of claim 1, further comprising:

determining, based on the utility usage information, an estimated carbon dioxide emissions amount; and displaying, via the user interface, a display portion indicating the estimated carbon dioxide emissions amount.

8. A computer-implemented method comprising the operations of:

training a machine learning network to identify an appliance being used based on utility usage information of the appliance;

receiving water usage information from a first sensor device having a first sensor device processor, wherein the first sensor device is configured to sample at a predetermined rate and receive signals for water flow rate information from ultrasonic sensors coupled to a water pipe, and is configured to communicate via a long range wireless protocol (LoRa) via a first sensor device LoRa chip, wherein the first sensor device processor samples the signals and provides the signals to the first sensor device LoRa chip;

transmitting, from the first sensor device, the received water usage information to a LoRa radio of a hub device;

receiving electricity usage information from a second sensor device having second sensor device processor, wherein the second sensor device is configured to receive amperage information from clamp meters attached to electrical wiring, is configured to receive voltage information from a connection to a circuit of an electrical panel, and is configured to communicate via the LoRa protocol via a second sensor device LoRa chip, wherein the second sensor device processor samples the amperage information and provides the amperage information to the second sensor device LoRa chip;

transmitting, from the second sensor device, the received electricity usage information to the LoRa radio of the hub device;

receiving water heater usage information from a third sensor device having a third sensor device processor, wherein the third sensor device is configured to receive temperature information from temperature sensors positioned about a water heater and/or from a controller of the water heater, and is configured to communicate via the LoRa protocol via a third sensor device LoRa chip, wherein the third device processor samples the temperature information and provides the temperature information to the third sensor device LoRa chip;

transmitting, from the third sensor device, the received water usage information to the LoRa radio of the hub device, wherein the hub device is configured to send a wake up instruction to any of the first sensor device, the second sensor device and the third sensor device;

based on the received water usage information, and/or the received water heater usage information, identifying by the trained machine learning network, one or more appliances likely having been used, wherein the one or more appliances uses both electricity sourced from the circuit and water sourced from the water pipe;

presenting, via a user interface, two or more appliances that may have been used;

receiving, via the user interface, a user confirmation of an actual appliance of the two or more appliances that may have been used;

using the received user confirmation to improve the machine learning network predictability of the one or more appliances likely having been used;

determining utility usage information for the one or more appliances; and displaying, via a user interface, a graphical indication of the determined utility usage information for the one or more appliances being used, the user interface comprising a portion of the user interface graphically depicting utility information for the one or more appliances.

9. The method of claim 8, further comprising the operations of:
based on the received water usage information, the received electricity usage information and/or the received water heater usage information, determining aggregate usage information for a time period for electricity usage, water usage and gas usage; and
displaying, via the user interface, the determined aggregate usage information.

10. The method of claim 8, further comprising the operations of:
determining times for operation of the water heater; and
controlling operation of a water heater based on the determined times.

11. The method of claim 8, further comprising the operations of:
determining the occurrence of a water leak based on the received water usage information; and
presenting, via a user interface, an indication of a water leak.

12. The method of claim 8, further comprising the operations of:
transmitting from the first, second and third sensor device to a hub device; and
transmitting from the hub device to a service to receive the water usage information, the electricity information and the water heater usage information.

13. The method of claim 8, further comprising the operations of:
determining the likely appliance being used based on evaluation of sensor data obtained from one or more of the first, second or third sensor device;
receiving a user input via a user interface confirming what type of appliance has been used; and
based on the received user input retraining a machine learning model to improve the determination of the likely appliance, device or water outlet being used.

14. The method of claim 8, further comprising the operations of:
determining, based on the utility usage information, an estimated carbon dioxide emissions amount; and
displaying, via the user interface, a display portion indicating the estimated carbon dioxide emissions amount.

15. A computer program product comprising a non-transitory computer-readable medium having a computer-readable program code embodied therein to be executed by one or more processors, the program code including instructions to perform the operation of:
training a machine learning network to identify an appliance being used based on utility usage information of the appliance;
receiving water usage information from a first sensor device having a first sensor device processor, wherein the first sensor device is configured sample at a predetermined rate and to receive signals for water flow rate information from ultrasonic sensors coupled to a water pipe, and is configured to communicate via a long range wireless protocol (LoRa) via a first sensor device LoRa chip, wherein the first sensor device processor samples the signals and provides the signals to the first sensor device LoRa chip;
transmitting, from the first sensor device, the received water usage information to a LoRa radio of a hub device;
receiving electricity usage information from a second sensor device having second sensor device processor, wherein the second sensor device is configured to receive amperage information from clamp meters attached to electrical wiring, and is configured to receive voltage information from a connection to a circuit of an electrical panel, and is configured to communicate via the LoRa protocol via a second sensor device LoRa chip, wherein the second sensor device processor samples the amperage information and provides the amperage information to the second sensor device LoRa chip;
transmitting, from the second sensor device, the received electricity usage information to the LoRa radio of the hub device;
receiving water heater usage information from a third sensor device having a third sensor device processor, wherein the third sensor device is configured to receive temperature information from temperature sensors positioned about a water heater and/or from a controller of the water heater, and is configured to communicate via the LoRa protocol via a third sensor device LoRa chip, wherein the third device processor samples the temperature information and provides the temperature information to the third sensor device LoRa chip;

transmitting, from the third sensor device, the received water usage information to the LoRa radio of the hub device, wherein the hub device is configured to send a wake up instruction to any of the first sensor device, the second sensor device and the third sensor device;

based on the received water usage information, and/or the received water heater usage information, and the received electricity usage information, identifying by the trained machine learning network, one or more appliances likely having been used, wherein the one or more appliances uses both electricity sourced from the circuit and water sourced from the water pipe;

presenting, via a user interface, two or more appliances that may have been used;

receiving, via the user interface, a user confirmation of an actual appliance of the two or more appliances that may have been used;

using the received user confirmation to improve the machine learning network predictability of the one or more appliances likely having been used;

determining utility usage information for the one or more appliances; and displaying, via a user interface, a graphical indication of the determined utility usage information for the one or more appliances being used, the user interface comprising a portion of the user interface graphically depicting utility information for the one or more appliances.

16. The computer program product of claim 15, further comprising the operations of:
based on the received water usage information, the received electricity usage information and/or the received water heater usage information, determining aggregate usage information for a time period for electricity usage, water usage and gas usage; and
displaying, via the user interface, the determined aggregate usage information.

17. The computer program product of claim 15, further comprising the operations of:
determining times for operation of the water heater; and
controlling operation of a water heater based on the determined times.

18. The computer program product of claim 15, further comprising the operations of:
determining the occurrence of a water leak of a particular appliance based on the received water usage information; and
presenting, via a user interface, an indication and a possible location of the water leak of the particular appliance.

19. The computer program product of any one of claim 15, further comprising the operations of:
transmitting from the first, second and third sensor device to a hub device; and
transmitting from the hub device to a service to receive the water usage information, the electricity information and the water heater usage information.

20. The computer program product of claim 15, further comprising the operations of:
determining the likely appliance being used based on evaluation of sensor data obtained from one or more of the first, second or third sensor device;
receiving a user input via a user interface confirming what type of appliance; and
based on the received user input retraining a machine learning model to improve the determination of the likely appliance, device or water outlet being used.

21. The computer program product of claim 15, further comprising the operations of:
determining, based on the utility usage information, an estimated carbon dioxide emissions amount; and
displaying, via the user interface, a display portion indicating the estimated carbon dioxide emissions amount.

* * * * *